(12) United States Patent
Nie

(10) Patent No.: US 12,229,336 B2
(45) Date of Patent: Feb. 18, 2025

(54) SYSTEMS AND METHODS FOR CALIBRATING AN EYE TRACKING SYSTEM

(71) Applicant: Xiaochun Nie, Mountain View, CA (US)

(72) Inventor: Xiaochun Nie, Mountain View, CA (US)

( * ) Notice: Subject to any disclaimer, the term of this patent is extended or adjusted under 35 U.S.C. 154(b) by 111 days.

(21) Appl. No.: 18/092,369

(22) Filed: Jan. 2, 2023

(65) Prior Publication Data

US 2023/0152887 A1     May 18, 2023

Related U.S. Application Data

(62) Division of application No. 16/753,907, filed as application No. PCT/US2018/054914 on Oct. 9, 2018, now Pat. No. 11,573,630.

(60) Provisional application No. 62/570,161, filed on Oct. 10, 2017.

(51) Int. Cl.
| | | |
|---|---|---|
| G06F 3/01 | (2006.01) | |
| G06T 7/73 | (2017.01) | |
| G06V 10/147 | (2022.01) | |
| G06V 40/18 | (2022.01) | |
| H04N 23/90 | (2023.01) | |
| G06V 10/62 | (2022.01) | |

(52) U.S. Cl.
CPC ............... *G06F 3/013* (2013.01); *G06F 3/012* (2013.01); *G06T 7/74* (2017.01); *G06V 10/147* (2022.01); *G06V 40/193* (2022.01); *H04N 23/90* (2023.01); *G06T 2207/30201* (2013.01); *G06V 10/62* (2022.01)

(58) Field of Classification Search
None
See application file for complete search history.

(56) References Cited

U.S. PATENT DOCUMENTS

2014/0180162 A1    6/2014    Schuhrke et al.
2017/0264879 A1*   9/2017    Zhou ..................... G06F 3/013

FOREIGN PATENT DOCUMENTS

| CN | 106662917 A | 5/2017 |
|---|---|---|
| EP | 1840627 B1 | 12/2012 |
| WO | 2016151581 A1 | 9/2016 |

* cited by examiner

*Primary Examiner* — James M Anderson, II
(74) *Attorney, Agent, or Firm* — IPro, PLLC

(57) ABSTRACT

Disclosed herein are various methods of calibrating relative orientation between imaging sensor and spatial orientation sensor, and relative orientation between imaging sensors.

6 Claims, 9 Drawing Sheets

SYSTEMS AND METHODS FOR CALIBRATING AN EYE TRACKING SYSTEM

CROSS-REFERENCE TO RELATED APPLICATIONS

The disclosure herein relates U.S. Patent Application Nos. 62/557,786 and 62/570,161, and PCT Application No. PCT/US2016/065141, the disclosures of which are hereby incorporated by reference in their entirety.

BACKGROUND

Human computer interaction (HCI), or generally human machine interaction, focuses on design and use of computer technology as well as interfaces between a user and a computer. HCI depends on responsive, intuitive and accurate measurements of human input actions. Mouse, Keyboard and touch screen are conventional input devices that require user's hands-on controls. Some input devices like Microsoft Kinect® are capable of tracking the user's body or hand gestures without any physical contact. The word "user" and the word "person" may be used interchangeably in this disclosure.

The recent progress in virtual reality (VR) brought VR goggles to consumer market. VR goggles can create immersive three-dimensional (3D) experience to the user. The user can look around in virtual world by a turn of the head just like looking around in the real world.

Augmented reality (AR) is another area that is progressing fast. One major difference between AR and VR is that AR operates in real-time on real world scenes as opposed to solely computer created or recorded scenes in VR. In both VR and AR, it will be very useful to know where the user is looking at and what actions the user wants to take on the intended targets. Effective and reliable eye tracking will enable a broad range of applications under such circumstances.

Self-driving vehicles are also taking the front stage nowadays. There are situations where a car in its autonomous mode might need a driver's attention due to updated road or traffic conditions or driving mode changes. As such, it is useful to constantly monitor where the driver is looking at.

Machine learning and artificial intelligence (AI) may work in a cycle of learning, modeling and predicting. Quick and intuitive tracking the user's attention point for data acquisition and confirmation can play an important role in this loop.

SUMMARY

Disclosed herein is a method comprising: obtaining a first three-dimensional (3D) line passing a center of a person's eye that is gazing at a point in a 3D space, based on a first relative orientation of the eye with respect to a first imaging sensor and a first relative position of a pupil or limbus of the eye with respect to the first imaging sensor; obtaining a second 3D line passing the center of the eye; and determining a relative position of the center of the eye with respect to the first imaging sensor, based on the first 3D line and the second 3D line.

According to an embodiment, the method further comprises obtaining the first relative position of the pupil or limbus with respect to the first imaging sensor based on an image of the pupil or limbus obtained by the first imaging sensor.

According to an embodiment, the method further comprises obtaining the first relative orientation of the eye with respect to the first imaging sensor based on a second relative orientation of the eye with respect to a second imaging sensor and based on a relative orientation of the first imaging sensor with respect to the second imaging sensor.

According to an embodiment, the method further comprises obtaining the second relative orientation of the eye with respect to the second imaging sensor based on an image of the point obtained by the second imaging sensor.

Disclosed herein is a method comprising: obtaining an image of a pupil or limbus of a person's eye by a first imaging sensor; determining a first relative orientation of the eye with respect to the first imaging sensor based on the image; determining a second relative orientation of the eye with respect to a second imaging sensor based on the first relative orientation and based on a relationship between the first imaging sensor and the second imaging sensor.

According to an embodiment, the method further comprises: determining the relationship based on at least three pairs of relative orientations of the eye, each pair comprising a third relative orientation of the eye with respect to the first imaging sensor obtained from an image obtained by the first imaging sensor of a pupil or limbus of the eye, and each pair comprising a fourth relative orientation of the eye with respect to the second imaging sensor obtained from an image obtained by the second imaging sensor of a point the eye is gazing at.

According to an embodiment, determining the first relative orientation is further based on a relative position of a center of the eye with respect to the first imaging sensor.

According to an embodiment, the method further comprises determining a position of a point at which the eye is gazing at, in an image obtained by the second imaging sensor, based on the second relative orientation.

Disclosed herein is a method comprising: obtaining an image of a pupil or limbus of a person's eye by an imaging sensor; determining a relative orientation of the eye with respect to the imaging sensor based on the image; adjusting the relative orientation of the eye with respect to the first imaging sensor based on a result of calibration.

According to an embodiment, the method further comprises obtaining the result of calibration based on at least three pairs of relative orientations of the eye, each pair comprising a first relative orientation of the eye with respect to a first imaging sensor obtained from an image obtained by the first imaging sensor of a pupil or limbus of the eye, and comprising a second relative orientation of the eye with respect to the first imaging sensor obtained from an image obtained by a second imaging sensor of a point the eye is gazing at.

According to an embodiment, determining the relative orientation is further based on a relative position of a center of the eye with respect to the imaging sensor.

Disclosed herein is a method comprising: while a person's head is at a first orientation and the person's eye is gazing at a point in a 3D space, obtaining a first relative orientation of the eye with respect to a first imaging sensor, and obtaining a first set of images by a second imaging sensor of a first pair of points in the 3D space; while the head is at a second orientation rotationally offset from the first orientation and the eye is gazing at the point, obtaining a second relative orientation of the eye with respect to the first imaging sensor, and obtaining a second set of images by the second imaging sensor of the first pair of points and a first set of images by the second imaging sensor of a second pair of points in the 3D space; while the head is at a third orientation rotationally offset from the second orientation about an axis along the second relative orientation of the eye and the eye is gazing at the point, obtaining a second set of images by the second imaging sensor of the second pair of points; determining a relative orientation of the first imaging sensor and the second imaging sensor based on the first relative orientation of the eye with respect to the first imaging sensor, the second relative orientation of the eye with respect to the first imaging sensor, the first set of images of the first pair of points, the second set of images of the first pair of points, the first set of images of the second pair of points, and the second set of images of the second pair of points.

According to an embodiment, obtaining the first relative orientation of the eye with respect to the first imaging sensor or obtaining the second relative orientation of the eye with respect to the first imaging sensor is based on an image of a pupil or limbus of the eye obtained by the first imaging sensor.

According to an embodiment, the third orientation is rotationally offset from the second orientation about an axis along a vector representing the second relative orientation of the eye.

According to an embodiment, the first pair of points is the same as the second pair of points.

Disclosed herein is a method comprising: while a person's head is at a first orientation and the person's eye is gazing at a point in a 3D space, obtaining a first relative orientation of the eye with respect to an imaging sensor, and obtaining a first output of a spatial orientation sensor; while the head is at a second orientation rotationally offset from the first orientation and the eye is gazing at the point, obtaining a second relative orientation of the eye with respect to the imaging sensor, and obtaining a second output of the spatial orientation sensor; while the head is at a third orientation rotationally offset from the second orientation about an axis along a vector representing the second relative orientation of the eye and the eye is gazing at the point, obtaining a third output of the spatial orientation sensor; and determining a relative orientation of the imaging sensor with respect to the spatial orientation sensor based on the first relative orientation of the eye with respect to the imaging sensor, the second relative orientation of the eye with respect to the imaging sensor, the first output of the spatial orientation sensor, the second output of the spatial orientation sensor, the third output of the spatial orientation sensor.

According to an embodiment, obtaining the first relative orientation or the second relative orientation of the eye with respect to the imaging sensor is based on an image of a pupil or limbus of the eye obtained by the imaging sensor.

Disclosed herein is a method comprising: while a person's head is at a first orientation and the person's eye is gazing at a first point in a 3D space, obtaining a first relative orientation of the eye with respect to a first imaging sensor, and obtaining a first set of images by a second imaging sensor of a first pair of points in the 3D space; while the head is at a second orientation rotationally offset from the first orientation and the eye is gazing at the first point, obtaining a second relative orientation of the eye with respect to the first imaging sensor, and obtaining a second set of images by the second imaging sensor of the first pair of points; while the head is at a third orientation and the eye is gazing at a second point in the 3D space, obtaining a third relative orientation of the eye with respect to the first imaging sensor, and obtaining a first set of images by the second imaging sensor of a second pair of points in the 3D space; while the head is at a fourth orientation rotationally offset from the third orientation and the eye is gazing at the second point, obtaining a fourth relative orientation of the eye with respect to the first imaging sensor, and obtaining a second set of images by the second imaging sensor of the second pair of points; determining a relative orientation of the first imaging sensor with respect to the second imaging sensor based on the first relative orientation of the eye with respect to the first imaging sensor, the second relative orientation of the eye with respect to the first imaging sensor, the third relative orientation of the eye with respect to the first imaging sensor, the fourth relative orientation of the eye with respect to the first imaging sensor, the first set of images of the first pair of points, the second set of images of the first pair of points, the first set of images of the second pair of points, and the second set of images of the second pair of points.

According to an embodiment, obtaining the first relative orientation, the second relative orientation, the third relative orientation or the fourth relative orientation of the eye with respect to the first imaging sensor is based on an image of a pupil or limbus of the eye obtained by the first imaging sensor.

According to an embodiment, the third orientation is rotationally offset from the second orientation.

According to an embodiment, the third orientation and the second orientation are the same.

According to an embodiment, the first pair of points is the same as the second pair of points.

According to an embodiment, the first point is the same as the second point.

Disclosed herein is a method comprising: while a person's head is at a first orientation and the person's eye is gazing at a first point in a 3D space, obtaining a first relative orientation of the eye with respect to an imaging sensor, and obtaining a first output of a spatial orientation sensor; while the head is at a second orientation rotationally offset from the first orientation and the eye is gazing at the first point, obtaining a second relative orientation of the eye with respect to the imaging sensor, and obtaining a second output of the spatial orientation sensor; while the head is at a third orientation and the eye is gazing at a second point in the 3D space, obtaining a third relative orientation of the eye with respect to the imaging sensor, and obtaining a third output of the spatial orientation sensor; while the head is at a fourth orientation rotationally offset from the third orientation and the eye is gazing at the second point, obtaining a fourth relative orientation of the eye with respect to the imaging sensor, and obtaining a fourth output of the spatial orientation sensor; determining a relative orientation of the imaging sensor with respect to the spatial orientation sensor based on the first relative orientation of the eye with respect to the imaging sensor, the second relative orientation of the eye with respect to the imaging sensor, the third relative orientation of the eye with respect to the imaging sensor, the fourth relative orientation of the eye with respect to the imaging sensor, the first output of the spatial orientation sensor, the second output of the spatial orientation sensor, the third output of the spatial orientation sensor, and the fourth output of the spatial orientation sensor.

According to an embodiment, obtaining the first relative orientation, the second relative orientation, the third relative orientation or the fourth relative orientation of the eye with respect to the imaging sensor is based on an image of a pupil or limbus of the eye obtained by the imaging sensor.

According to an embodiment, the third orientation is rotationally offset from the second orientation.

According to an embodiment, the third orientation and the second orientation are the same.

According to an embodiment, the first point is the same as the second point.

Disclosed herein is a computer program product comprising a non-transitory computer readable medium having instructions recorded thereon, the instructions when executed by a computer implementing any of the above methods.

DETAILED DESCRIPTION

A 3D coordinate system using the right-hand rule is defined in Part A1.1 of the Appendix section. A 2D coordinate system for camera image frame is defined in Part A1.2 of the Appendix section.

Mathematical utility functions used in this disclosure are listed in Part A2 of the Appendix section. Quaternion, vector and matrix mathematics is discussed herein. Quaternions are widely used in this disclosure. A function using quaternions can also be expressed using matrices, Euler angles or other suitable mathematic expressions.

In abbreviations in the form of "A_B_C" used in this disclosure: A represents the type; B represents the specific; C represents the context. As an example, an abbreviation "q_c_h" means a quaternion "q" representing the orientation of a camera "c" in the head coordinate system "h." As another example, "q_cf_ce" means a quaternion "q" representing the orientation of a field camera "cf" in the eye camera coordinate system "ce." See Part A2 of the Appendix section.

This disclosure relates to system and methods for calibrating an eye tracking system that comprises an eye camera and a field camera. Confirmed gaze vectors obtained from gaze point images captured from the field camera can be used for calculating the eye center position relative to the eye camera, and for correcting measured gaze vectors from the eye camera. Orientation of the eye coordinate system and reference coordinate system may be obtained by calibration processes to determine the relative orientation between the eye and field cameras, and relative orientation between the eye camera and a spatial orientation sensor. A spatial orientation sensor is a device that measures its own orientation in a 3D space.

Figure 4:
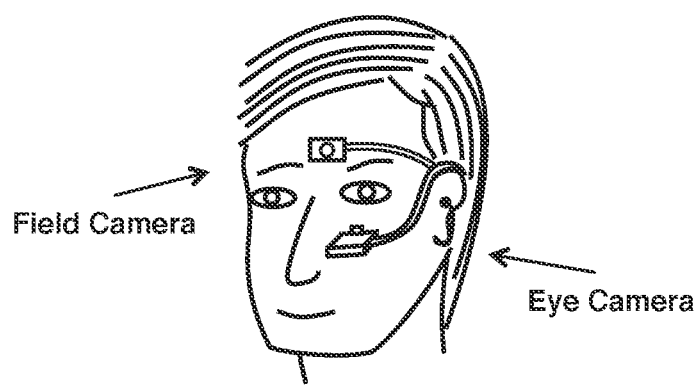
FIG. 4 shows that an eye camera and a field camera are attached to a harness frame worn by a user.

In one embodiment, there are two cameras, eye camera CE and field camera CF. Their relative orientation does not change. Their orientations relative to the user's head do not change. The relative orientation of the field camera CF coordinate system to the eye camera CE coordinate system is not required to be available. The eye camera CE is facing an eye of the user. The field camera CF is facing away from the eye, as schematically shown in FIG. 4. The eye camera CE takes images of the user's eye. The field camera CF takes images of the scene in front of the user. It is assumed that the measured gaze vector in the eye camera CE coordinate system can be obtained. The relative orientation of the field camera CF coordinate system with respect to the eye camera CE coordinate system may be known.

In one embodiment, there is an eye camera CE and a spatial orientation sensor G. Their relative orientation does not change. Their orientations relative to the user's head do not change. The relative orientation of the eye camera CE coordinate system to the spatial orientation sensor G coordinate system is not required to be available. The eye camera CE is facing an eye of the user and takes images of the user's eye. The spatial orientation sensor G measures its own orientation in the world coordinate system.

A gaze vector is the vector pointing from the center of the user's eye to the point where the user is looking at. A gaze vector represents the orientation of the eye. A gaze point is the point in the world where the user is looking at. A measured gaze vector is obtained from the image of the pupil center or the limbus center captured by the eye camera. A confirmed gaze vector is obtained from the image of the gaze point captured by the field camera.

In a calibration process for getting a confirmed vector transformed from the field camera CF to the eye camera CE, the user looks at an object as a gaze point in front of the field camera CF. A confirmed gaze vector in the field camera CF coordinate system can be obtained from the gaze point image point in the field camera CF image plane. The gaze point image point can be obtained either by user manually picking it or automatic machine vision methods which are out of the scope of this disclosure.

The confirmed gaze vector in the field camera CF coordinate system can be further converted into the confirmed gaze vector in the eye camera CE coordinate system (see Part C1 in the Methods section), assuming the orientation of the field camera CF relative to the eye camera CE is known.

In a calibration process, the user looks at an object as a gaze point in front of the field camera CF. Knowing the confirmed gaze point image point in the field camera CF image plane and its corresponding pupil center image point or limbus center image point in the eye camera CE image plane, a line that passes the eye ball center in the eye camera CE coordinate system can be obtained.

Knowing two or more lines that pass the eye ball center in the eye camera CE coordinate system, the position of the eye ball center can be obtained.

Knowing the eye ball center in the eye camera CE coordinate system, and a pupil center image point or limbus center image point in the eye camera CE image plane, the gaze vector in the eye camera coordinate system can be obtained.

Figure 3:
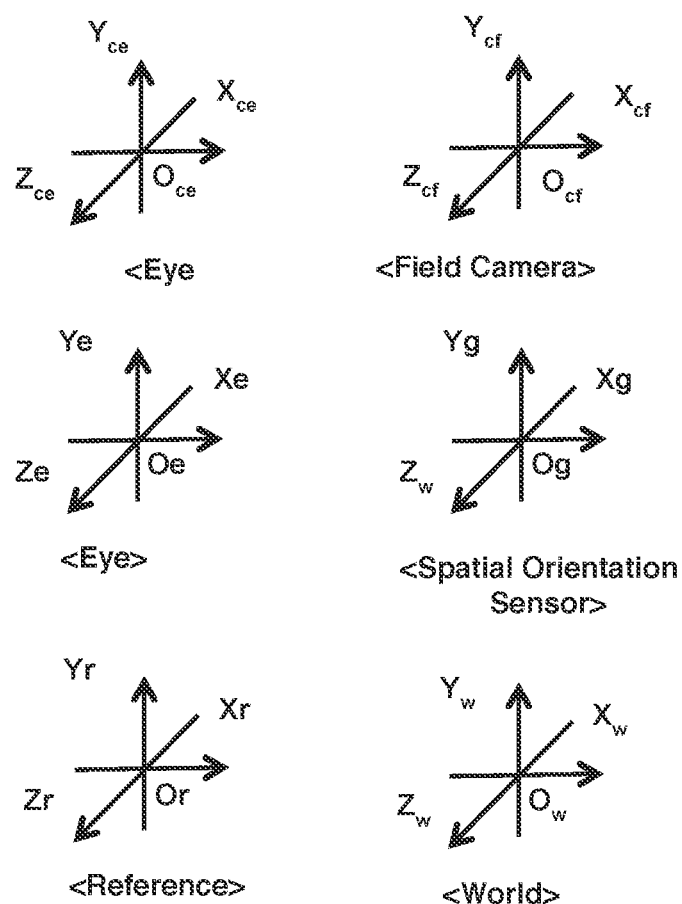
FIG. 3 shows several 3D coordinate systems referred to herein.

This disclosure refers to the following coordinate system as shown in FIG. 3. They are defined as:

Eye camera CE coordinate system Xce-Yce-Zce-Oce:CS-CE

Field camera CF coordinate system Xcf-Ycf-Zcf-Ocf: CS-CF

Spatial orientation Sensor coordinate system Xg-Yg-Zg-Og: CS-CG

Eye coordinate system Xe-Ye-Ze-Oe: CS-CE

Reference coordinate system Xr-Yr-Zr-Or: CS-CR

World coordinate system Xw-Yw-Zw-Ow: CS-W

System Hardware, Software and Configuration

An imaging sensor measures the brightness, both brightness and color of light. A camera is one kind of imaging sensor. Other kinds of imaging sensors can be used here in similar ways. A camera can be of color, grayscale, infrared or non-infrared, etc. Parameters of a camera include its physical dimensions, resolution and focal length of the lens mounted etc. A 2D camera image frame coordinate system for is defined for camera output. See Part A1.2 in the Appendix section.

Head Gear. The apparatus to fix the cameras and other sensors to the user's head. It can be a glasses frame, a head band or a helmet, etc., depending on the applications.

Computer. A computer processes the output of the sensing unit and calculates the motion/gesture tracking results. It can be either an embedded system or a desktop system.

Software. The computer software implements the algorithms and enables the workflows.

Configuration. For one embodiment, as shown in FIG. 4, as an eye tracking and gaze point recording system, an eye camera and a field camera are attached to a harness frame worn by the user. The relative orientation between the two cameras does not change. The orientations of the two cameras relative to the user's head do not change, either.

Obtaining a confirmed gaze vector in eye camera CE coordinate system CS-E from a confirmed gaze point image point in field camera CF image plane is described below.

In a calibration process, the user looks at an object as a gaze point in front of the field camera CF, a confirmed gaze point image point in the field camera CF image plane can be obtained. A confirmed gaze vector in the field camera CF coordinate system can be obtained from this confirmed gaze point image point in the field camera CF image plane.

Assuming the relative orientation of the field camera CF coordinate system with respect to the eye camera CE coordinate system is known, the confirmed gaze vector in the field camera CF coordinate system can be further converted into the confirmed gaze vector in the eye camera CE coordinate system (See Part C1 in the Methods section).

Obtaining a line passing the eye ball center in eye camera CE coordinate system from a confirmed gaze point image point in field camera CF image plane and its corresponding pupil center image point or limbus center image point in eye camera CE image plane is described below.

When the relative orientation of the field camera CF coordinate system with respect to the eye camera CE coordinate system may be known, the user looks at one object as a gaze point in front of the field camera, the confirmed gaze point image point in the field camera CF image plane can be obtained. The pupil center image point or limbus center image point in eye camera CE image plane can be obtained.

Knowing the confirmed gaze point image point in the field camera CF image plane and the pupil center image point or limbus center image point in the eye camera CE image plane, a line passing eye ball center in the eye camera CE coordinate system can be obtained (See Part C2 in the Methods section).

Obtaining the eye ball center in eye camera CE coordinate system from two or more pairs of confirmed gaze point image points in the field camera CF image plane and its corresponding pupil center image point or limbus center image point in the eye camera CE image plane is described below.

By performing the process above at least two times, at least two lines that pass the eye ball center in the eye camera CE coordinate system can be obtained. Using these lines, the eye ball center in the eye camera CE coordinate system CS-CE can be obtained (See Part C3 in the Methods section). The eye ball center (i.e., the origin of the eye coordination system CS-E) in the eye camera CE coordinate system can be used for obtaining a gaze vector from pupil center image or limbus center image point of the eye in the eye camera CE image plane using methods described in Part C1 of the Algorithms section in PCT Patent Application No. PCT/US2016/065141.

Obtaining a correction matrix from three pairs of gaze vectors, each pair of gaze vectors comprising a confirmed gaze vector in the field camera CF coordinate system and its corresponding measured gaze vector in the eye camera CE coordinate system, is described below.

The user looks at one object as a gaze point in front of the field camera, the confirmed gaze vector in field camera CF image plane can be obtained. The corresponding measured gaze vector in eye camera CE coordinate system can also be obtained.

By repeating this process three times, three pairs of confirmed gaze vector in field camera CF coordinate system and its corresponding measured gaze vector in eye camera CE coordinate system can be obtained. A correction matrix can be obtained (See Part C4 in the Methods section).

This correction matrix represents a connection between the measured gaze vector in the eye camera CE coordinate system and the confirmed gaze vector in the field camera CF coordinate system in a tracking mode.

Obtaining a correction matrix from three pairs of gaze vectors, each pair of gaze vectors comprising confirmed gaze vector in eye camera CE coordinate system and its corresponding measured gaze vector in eye camera CE coordinate system, is described below.

Under the assumption that the measured gaze vector in the eye camera CE coordinate system can be obtained and the relative orientation of field camera CF coordinate system with respect to the eye camera CE coordinate system is known, the user looks at one object as a gaze point in front of the field camera, and the confirmed gaze vector in field camera CF coordinate system can be obtained. The confirmed gaze vector in the field camera CF coordinate system can be converted into the confirmed gaze vector in the eye camera CE coordinate system. The corresponding measured gaze vector in eye camera CE coordinate system can also be obtained.

By repeating this process three times, three pairs of confirmed gaze vector in eye camera CE coordinate system and its corresponding measured gaze vector in eye camera CE coordinate system are obtained. A correction matrix can be obtained (See Part C4 in the Methods section).

This correction matrix represents a connection between the measured gaze vector in the eye camera CE coordinate system and the confirmed gaze vector in the eye camera CE coordinate system in a tracking mode.

Obtaining a corrected gaze vector from a measured gaze vector and a correction matrix is described below.

Under the assumption that the measured gaze vector in eye camera CE coordinate system can be obtained, in a tracking mode, a measured gaze vector in eye camera CE coordinate system can be obtained. Knowing the correction matrix that links the measured gaze vector in the eye camera CE coordinate system to the confirmed gaze vector in the field camera CF coordinate system, a corrected gaze vector in field camera CF coordinate system can be obtained (See Part C5 in the Methods section). As the gaze vector represents the direction the user's eye is pointing to, the corrected gaze vector provides a direction about what the user is seeing in the field camera CF coordinate system with measuring error corrected and relative orientation between the eye camera CE and field camera CF taken into account.

Under the assumption that the measured gaze vector in eye camera CE coordinate system can be obtained and the relative orientation of the field camera CF coordinate system with respect to the eye camera CE coordinate system is known, in a tracking mode, a measured gaze vector in eye camera coordinate system can be obtained. Knowing the correction matrix linking the measured gaze vector in the eye camera CE coordinate system to the confirmed gaze vector in the eye camera CE coordinate system, a corrected gaze vector in eye camera coordinate system can be obtained (See Part C5 in the Methods section). As the gaze vector represents the direction the user's eye is pointing to, the corrected gaze vector provides a direction about what the user is seeing in the eye camera coordinate system with measuring errors corrected.

Obtaining the orientation of the eye camera CE coordinate system CS-CE to the field camera CF coordinate system CS-CF from three orientation changes of the system is described below.

Under the assumption that the measured gaze vector in eye camera CE coordinate system can be obtained, four physical points PA, PB, PC and PD in the field of view of the field camera can be identified, where PC and PD, as a pair, can be the same as, or different from PA and PB as a pair.

In a calibration process to determine the orientation of CS-CE in CS-CF:

First step, the user picks an object in the world as a gaze point, first gaze vector v_gaze_ce_1 in CS-CE is obtained. The images of point PA and PB in the field camera CF coordinate system are obtained as p_a_i_1, p_b_i_1.

Second step, without losing the same gaze point, the user rotates the head to a second position, a second gaze vector in CS-CE v_gaze_ce_2 is obtained. The images of point PA and PB in field camera CF coordinate system are obtained as p_a_i_2, p_b_i_2. The images of point PC and PD in field camera CF coordinate system are obtained as p_c_i_1, p_d_i_1.

Third step, without losing the same gaze point, the user rotates the head about the gaze vector v_gaze_ce_2, the images of point PC and PD in the field camera CF coordinate system are obtained as p_c_i_2, p_d_i_2.

Knowing v_gaze_ce_1 and v_gaze_ce_2, a quaternion q_eye_ce representing the orientation of the eye coordinate system CS-E in the eye camera CE coordinate system CS-CE can be obtained (See Part C6 in the Methods section).

In the same time, knowing p_a_i_1, p_b_i_1, p_a_i_2, p_b_i_2, p_c_i_1, p_d_i_1, and p_c_i_2, p_d_i_2, an quaternion q_ref_cf representing a reference coordinate system CS-R in field camera CF coordinate system CS-CF can be obtained (See Part C8 in the Methods section).

The method_index used in Part C6 in the Methods section for obtaining orientation of CS-E in CS-CE should be the same as method_index used in Part C8 in the Methods section for obtaining orientation of CS-R in CS-CF.

Knowing q_eye_ce and q_ref_cf, a quaternion representing the orientation of eye camera CE coordinate system CS-CE in field camera CF coordinate system CS-CF can be obtained (See Part C12 in the Methods section).

Obtaining the orientation of eye camera CE coordinate system CS-CE to field camera CF orientation sensor coordinate system CS-CF from four orientation changes of the System is described below.

Under the assumption that the measured gaze vector in eye camera CE coordinate system can be obtained, four physical points PA, PB, PC and PD in the field of view of the field camera can be identified, where PC and PD, as a pair, can be the same as, or different from PA and PB as a pair.

In a calibration process to determine the orientation of CS-CE in CS-CF:

First step, when the user's head is at a first position and the user stares at a gaze point, a first gaze vector v_gaze_ce_1 in CS-CE is obtained, and the images of point PA and PB in the field camera CF coordinate system are obtained as p_a_i_1, p_b_i_1.

Second step, without losing the same gaze point, the user rotates the head to a second position; at the end of the rotation, a second gaze vector in CS-CE v_gaze_ce_2 is obtained. The images of point PA and PB in field camera CF coordinate system are also obtained as p_a_i_2, p_b_i_2.

Third step, the user rotates the head to a third position while staring at the same gaze point or a new gaze point, a third gaze vector in CS-CE v_gaze_ce_3 is obtained. The images of point PC and PD in field camera CF coordinate system are obtained as p_c_i_1, p_d_i_1.

Fourth step, without losing the same gaze point used in third step, the user rotates the head to a fourth position, a fourth gaze vector in CS-CE v_gaze_ce_4 is obtained. The images of point PC and PD in field camera CF coordinate system are obtained as p_c_i_2, p_d_i_2.

Knowing v_gaze_ce_1, v_gaze_ce_2, v_gaze_ce_3 and v_gaze_ce_4, a quaternion q_eye_ce representing the orientation of the eye coordinate system CS-E in the eye camera CE coordinate system CS-CE can be obtained (See Part C7 in the Methods section).

Knowing p_a_i_1, p_b_i_1, p_a_i_2, p_b_i_2, p_c_i_1, p_d_i_1, and p_c_i_2, p_d_i_2, an quaternion q_ref_cf representing a reference coordinate system CS-R in field camera CF coordinate system CS-CF can be obtained (See Part C9 in the Methods section).

The method_index used in Part C7 in the Methods section for obtaining orientation of CS-E in CS-CE should be the same as method_index used in Part C9 in the Methods section for obtaining orientation of CS-R in CS-CF.

In one embodiment, the four positions of the user's head are up, down, left and right relative to a starting position.

Knowing q_eye_ce and q_ref_cf, q quaternion representing the orientation of the eye camera CE coordinate system CS-CE in the field camera CF coordinate system CS-CF can be obtained (See Part C12 in the Methods section).

Obtaining the orientation of the eye camera CE coordinate system CS-CE in the spatial orientation sensor G orientation sensor coordinate system CS-G from three orientation changes of the system is described below.

Under the assumption that the measured gaze vector in the eye camera CE coordinate system can be obtained, the orientation of CS-CE in CS-CF may be determined in the process below:

First step, the user picks an object in the world as a gaze point, a first gaze vector v_gaze_ce_1 in CS-CE is obtained. The output of the spatial orientation sensor G is obtained as q_g_w_1.

Second step, without losing the same gaze point, the user rotates the head to a second position, a second gaze vector in CS-CE v_gaze_ce_2 is obtained. The output of the spatial orientation sensor G is obtained as q_g_w_2, and q_g_w_3 is set to be the same as q_g_w_2.

Third step, without losing the same gaze point, the user rotates the head about the gaze vector v_gaze_ce_2. After the rotation, the output of the spatial orientation sensor G is obtained as q_g_w_4.

Knowing v_gaze_ce_1 and v_gaze_ce_2, a quaternion q_eye_ce representing the orientation of the eye coordinate system CS-E in the eye camera CE coordinate system CS-CE can be obtained using (See Part C6 in the Methods section).

Knowing q_g_w_1, q_g_w_2, q_g_w_3 and q_g_w_4, a quaternion q_ref_g representing a reference coordinate system CS-R in the spatial orientation sensor G coordinate system CS-G can be obtained (See Part C10 in the Methods section).

The method_index used in Part C6 in the Methods section for obtaining orientation of CS-E in CS-CE should be the same as method_index used in Part C10 in the Methods section for obtaining orientation of CS-R in CS-G.

Knowing q_eye_ce and q_ref_g, a quaternion representing the orientation of eye camera CE coordinate system CS-CE in spatial orientation sensor G coordinate system CS-G can be obtained (See Part C13 in the Methods section).

Obtaining the orientation of the eye camera CE coordinate system CS-CE in the spatial orientation sensor G orientation sensor coordinate system CS-G from four orientation changes of the system is described below.

Under the assumption that the measured gaze vector in eye camera CE coordinate system can be obtained, the user picks an object as in the world as a gaze point. Four physical points PA, PB, PC and PD in the field of view of the field camera can be identified where PC and PD as a pair, can be the same as, or different from PA and PB as a pair.

The orientation of CS-CE in CS-CF can be determined in the process below:

First step, when the user's head is at a first position and the user stares at a gaze point, a first gaze vector v_gaze_ce_1 in CS-CE is obtained, and the output of the spatial orientation sensor G is obtained as q_g_w_1.

Second step, without losing the same gaze point, the user rotates the head to a second position, a second gaze vector in CS-CE v_gaze_ce_2 is obtained. The output of the spatial orientation sensor G is obtained as q_g_w_2.

Third step, the user rotates the head to a third position while staring at the same gaze point or a new gaze point, a third gaze vector in CS-CE v_gaze_ce_3 is obtained. The output of the spatial orientation sensor G is obtained as q_g_w_3.

Fourth step, without losing the same gaze point used in third step, the user rotates the head to a fourth position, a fourth gaze vector in CS-CE v_gaze_ce_4 is obtained. The output of the spatial orientation sensor G is obtained as q_g_w_4.

Knowing v_gaze_ce_1, v_gaze_ce_2, v_gaze_ce_3 and v_gaze_ce_4, a quaternion q_eye_ce representing the orientation of the eye coordinate system CS-E in the eye camera CE coordinate system CS-CE can be obtained (See Part C7 in the Methods section).

Knowing q_g_w_1, q_g_w_2, q_g_w_3 and q_g_w_4, a quaternion q_ref_g representing a reference coordinate system CS-R in the spatial orientation sensor G coordinate system CS-G can be obtained (See Part C11 in the Methods section).

The method_index used in Part C7 in the Methods section for obtaining orientation of CS-E in CS-CE should be the same as method_index used in Part C11 in the Methods section for obtaining orientation of CS-R in CS-G.

In one embodiment, the four positions of the user's head are up, down, left and right relative to a starting position.

Knowing q_eye_ce and q_ref_g, a quaternion representing the orientation of the eye camera CE coordinate system CS-CE in the spatial orientation sensor G coordinate system CS-G can be obtained (See Part C13 in the Methods section).

In an embodiment, the third position may be the same as or rotationally offset from the second position.

Figure 5:
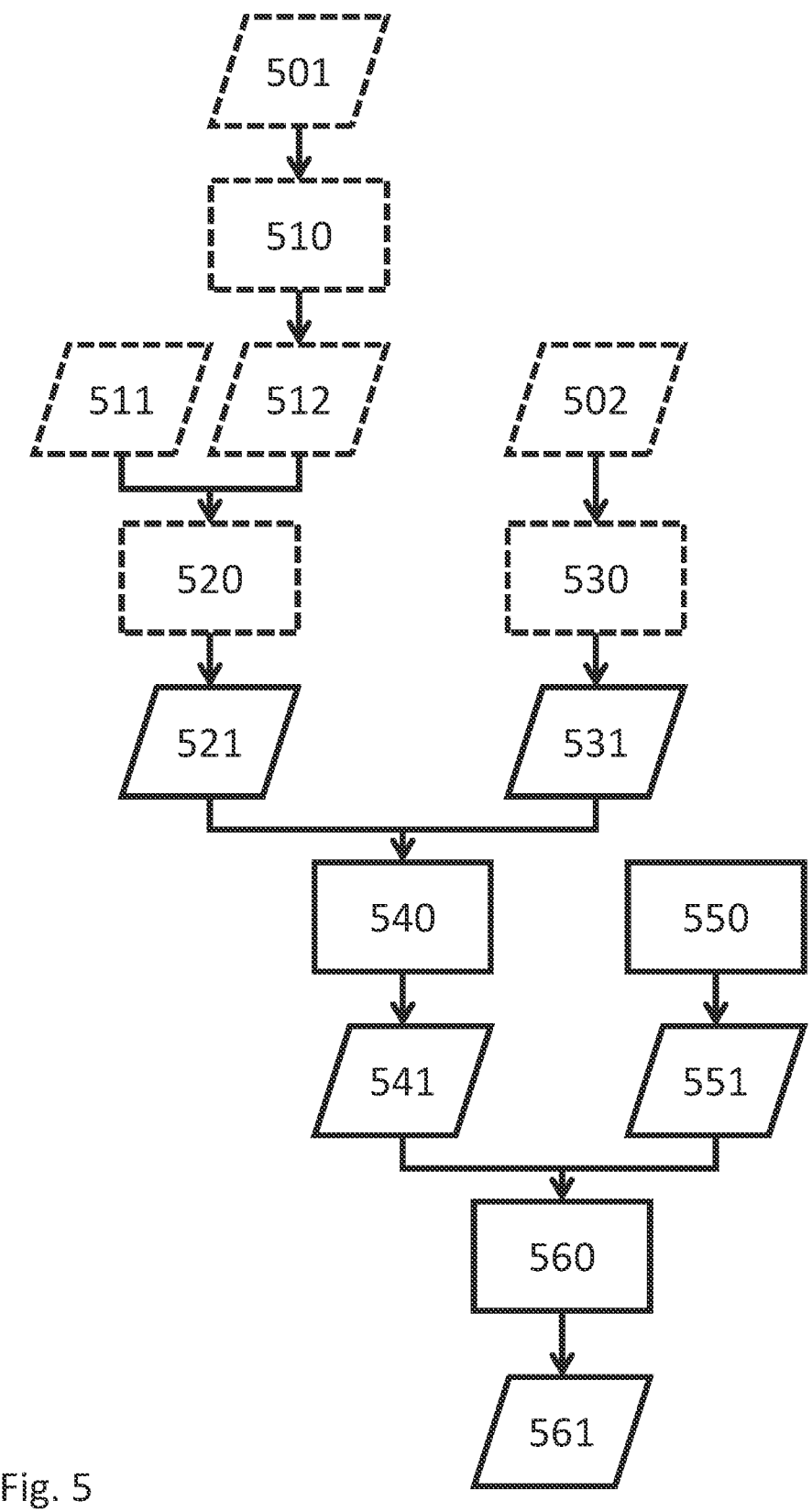
FIG. 5 schematically shows a flowchart of a method, according to an embodiment.

FIG. 5 schematically shows the flowchart of a method, according to an embodiment. In procedure 540, a first 3D line 541 passing a center of a person's eye that is gazing at a point in a 3D space is obtained, based on a first relative orientation 521 of the eye with respect to a first imaging sensor and a first relative position 531 of a pupil or limbus of the eye with respect to the first imaging sensor. In procedure 550, a second 3D line 551 passing the center of the eye is obtained. In procedure 560, a relative position 561 of the center of the eye with respect to the first imaging sensor is determined, based on the first 3D line 541 and the second 3D line 551. The method may include an optional procedure 530, in which the first relative position 531 of the pupil or limbus with respect to the first imaging sensor is obtained based on an image 502 of the pupil or limbus obtained by the first imaging sensor. The method may include an optional procedure 520, in which the first relative orientation 521 of the eye with respect to the first imaging sensor is obtained based on a second relative orientation 511 of the eye with respect to a second imaging sensor and based on a relative orientation 512 of the first imaging sensor with respect to the second imaging sensor. The method may include an optional procedure 510, in which the second relative orientation 511 of the eye with respect to the second imaging sensor is obtained based on an image 501 of the point obtained by the second imaging sensor.

Figure 6:
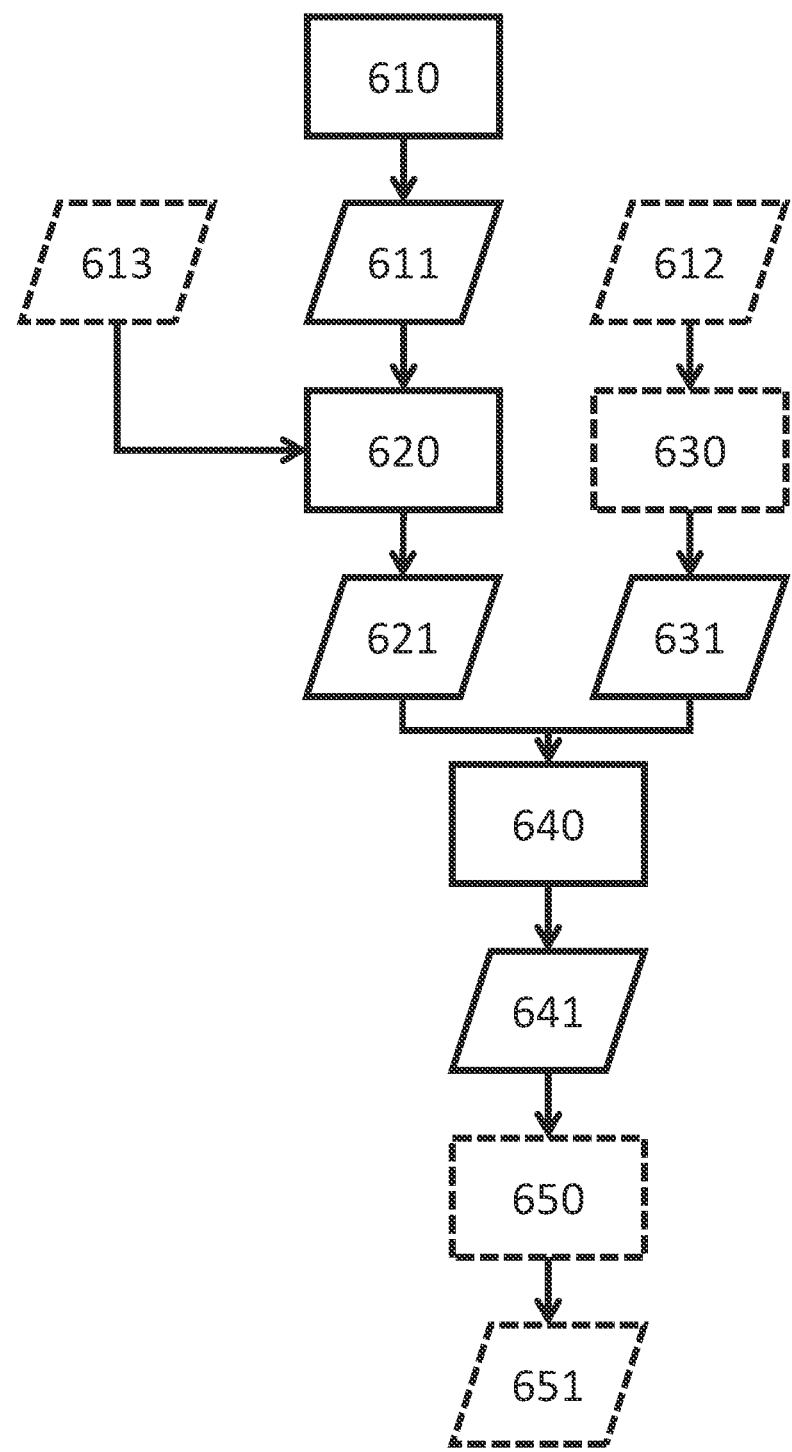
FIG. 6 schematically shows a flowchart of a method, according to an embodiment.

FIG. 6 schematically shows the flowchart of a method, according to an embodiment. In procedure 610, an image 611 of a pupil or limbus of a person's eye is obtained by a first imaging sensor. In procedure 620, a first relative orientation 621 of the eye with respect to the first imaging sensor is determined based on the image 611 and optionally further based on a relative position 613 of a center of the eye with respect to the first imaging sensor. In procedure 640, a second relative orientation 641 of the eye with respect to a second imaging sensor is determined based on the first relative orientation 621 and based on a relationship 631 between the first imaging sensor and the second imaging sensor. The method may include an optional procedure 630, in which the relationship 631 is determining based on at least three pairs 612 of relative orientations of the eye, each pair comprising a third relative orientation of the eye with respect to the first imaging sensor obtained from an image obtained by the first imaging sensor of a pupil or limbus of the eye, and each pair comprising a fourth relative orientation of the eye with respect to the second imaging sensor obtained from an image obtained by the second imaging sensor of a point the eye is gazing at. The method may include an optional procedure 650, in which a position 651 of a point at which the eye is gazing at, in an image obtained by the second imaging sensor, is determined based on the second relative orientation 641.

Figure 7:
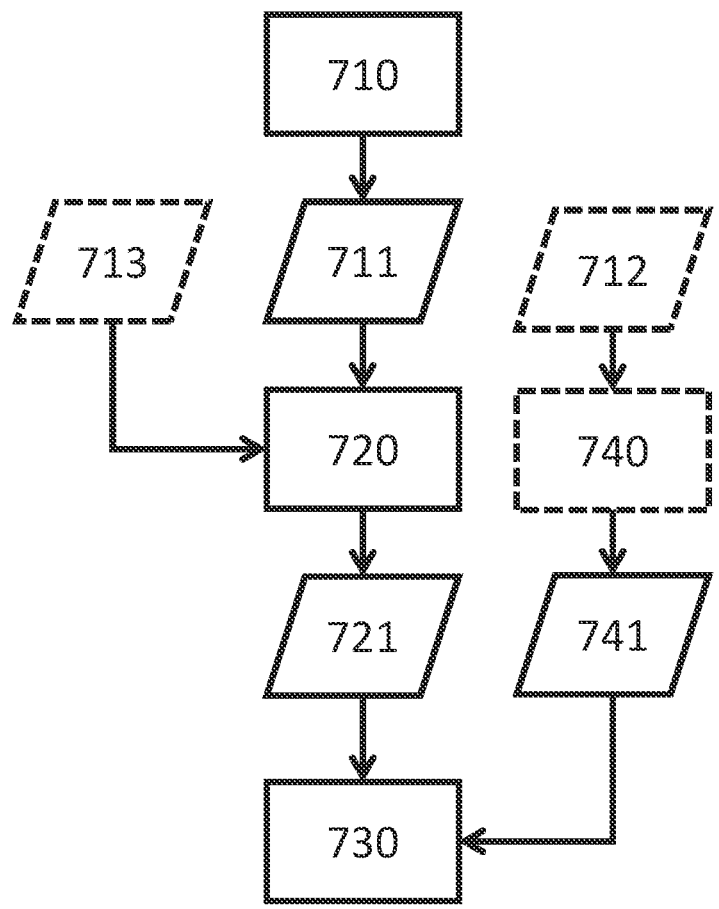
FIG. 7 schematically shows a flowchart of a method, according to an embodiment.

FIG. 7 schematically shows the flowchart of a method, according to an embodiment. In procedure 710, an image 711 of a pupil or limbus of a person's eye by an imaging sensor is obtained. In procedure 720, a relative orientation

721 of the eye with respect to the imaging sensor is determined based on the image 711 and optionally further based on a relative position 713 of a center of the eye with respect to the imaging sensor. In procedure 730, the relative orientation 721 of the eye with respect to the first imaging sensor is adjusted based on a result of calibration 741. The method may include an optional procedure 740, in which the result of calibration 741 is obtained based on at least three pairs 712 of relative orientations of the eye, each pair comprising a first relative orientation of the eye with respect to a first imaging sensor obtained from an image obtained by the first imaging sensor of a pupil or limbus of the eye, and comprising a second relative orientation of the eye with respect to the first imaging sensor obtained from an image obtained by a second imaging sensor of a point the eye is gazing at. The result of calibration 741 may be obtained further based on the relative orientation of the first imaging sensor with respect to the second image sensor.

Figure 8:
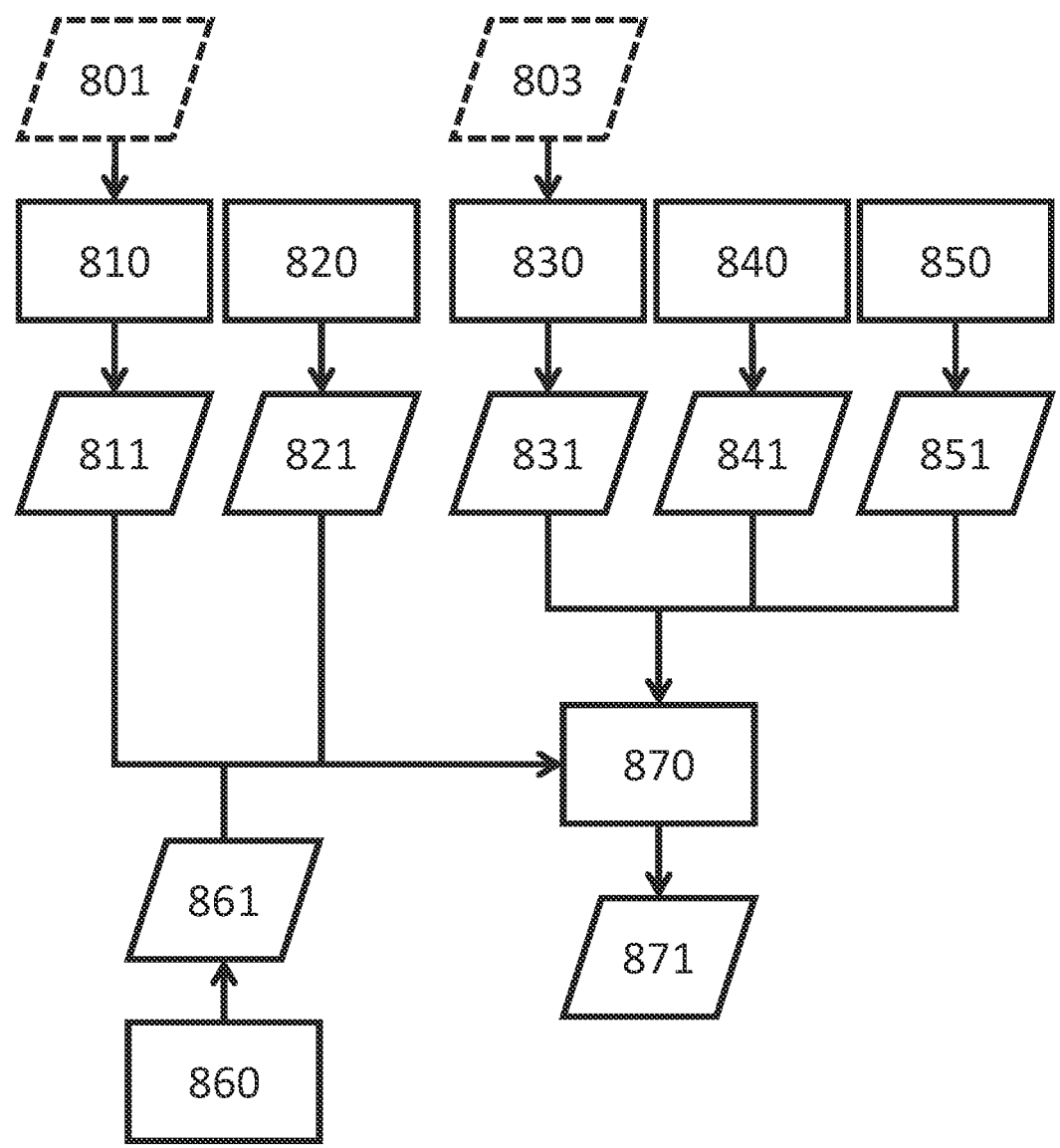
FIG. 8 schematically shows a flowchart of a method, according to an embodiment.

FIG. 8 schematically shows the flowchart of a method, according to an embodiment. In procedure 810, while a person's head is at a first orientation and the person's eye is gazing at a point in a 3D space, a first relative orientation 811 of the eye with respect to a first imaging sensor is obtained. The first relative orientation 811 of the eye with respect to a first imaging sensor may be obtained based on an image 801 of a pupil or limbus of the eye obtained by the first imaging sensor. In procedure 820, while the person's head is at the first orientation and the person's eye is gazing at the point in the 3D space, a first set 821 of images by a second imaging sensor of a first pair of points in the 3D space is obtained. In procedure 830, while the head is at a second orientation rotationally offset from the first orientation and the eye is gazing at the point, a second relative orientation 831 of the eye with respect to the first imaging sensor is obtained. The second relative orientation 831 of the eye with respect to the first imaging sensor may be obtained based on an image 803 of the pupil or limbus of the eye obtained by the first imaging sensor. In procedure 840, while the head is at the second orientation rotationally offset from the first orientation and the eye is gazing at the point, a second set 841 of images by the second imaging sensor of the first pair of points is obtained. In procedure 850, while the head is at the second orientation rotationally offset from the first orientation and the eye is gazing at the point, a first set 851 of images by the second imaging sensor of a second pair of points in the 3D space is obtained. The first pair of points may be the same as the second pair of points. In procedure 860, while the head is at a third orientation rotationally offset from the second orientation about an axis along a vector representing the second relative orientation 831 of the eye and the eye is gazing at the point, a second set 861 of images by the second imaging sensor of the second pair of points is obtained. In procedure 870, a relative orientation 871 of the first imaging sensor and the second imaging sensor is determined based on the first relative orientation 811 of the eye with respect to the first imaging sensor, the second relative orientation 831 of the eye with respect to the first imaging sensor, the first set 821 of images of the first pair of points, the second set 841 of images of the first pair of points, the first set 851 of images of the second pair of points, and the second set 861 of images of the second pair of points. The first pair of points may be the same as the second pair of points.

Figure 9:
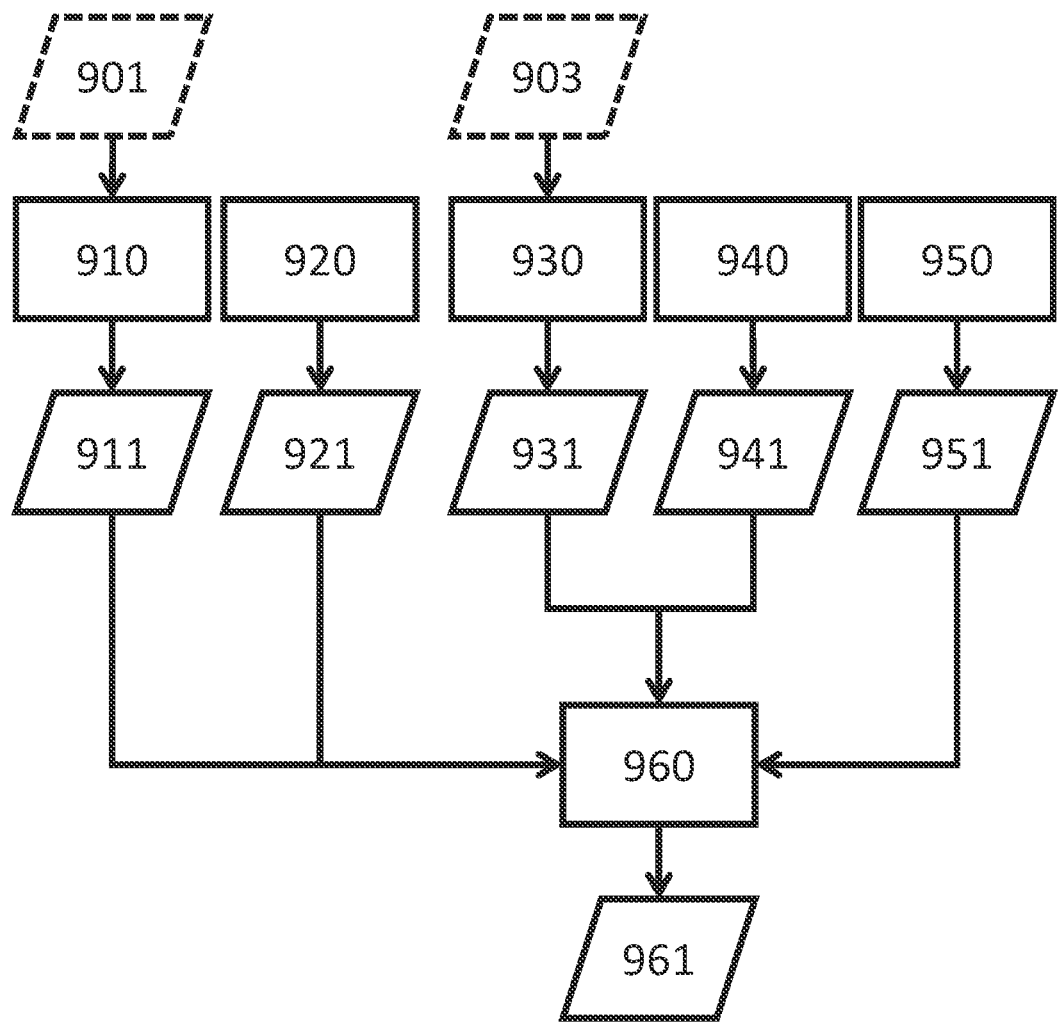
FIG. 9 schematically shows a flowchart of a method, according to an embodiment.

FIG. 9 schematically shows the flowchart of a method, according to an embodiment. In procedure 910, while a person's head is at a first orientation and the person's eye is gazing at a point in a 3D space, a first relative orientation 911 of the eye with respect to an imaging sensor is obtained. The first relative orientation 911 of the eye with respect to the imaging sensor may be obtained based on an image 901 of a pupil or limbus of the eye obtained by the imaging sensor. In procedure 920, while the person's head is at the first orientation and the person's eye is gazing at the point in the 3D space, a first output 921 of a spatial orientation sensor is obtained. In procedure 930, while the head is at a second orientation rotationally offset from the first orientation and the eye is gazing at the point, a second relative orientation 931 of the eye with respect to the imaging sensor is obtained. The second relative orientation 931 of the eye with respect to the imaging sensor may be obtained based on an image 903 of the pupil or limbus of the eye obtained by the imaging sensor. In procedure 940, while the head is at the second orientation rotationally offset from the first orientation and the eye is gazing at the point, a second output 941 of the spatial orientation sensor is obtained. In procedure 950, while the head is at a third orientation rotationally offset from the second orientation about an axis along a vector representing the second relative orientation 931 of the eye and the eye is gazing at the point, a third output 951 of the spatial orientation sensor is obtained. In procedure 960, a relative orientation 961 of the imaging sensor and the spatial orientation sensor is determined based on the first relative orientation 911 of the eye with respect to the imaging sensor, the second relative orientation 931 of the eye with respect to the imaging sensor, the first output 921 of the spatial orientation sensor, the second output 941 of the spatial orientation sensor, the third output 951 of the spatial orientation sensor.

Figure 10:
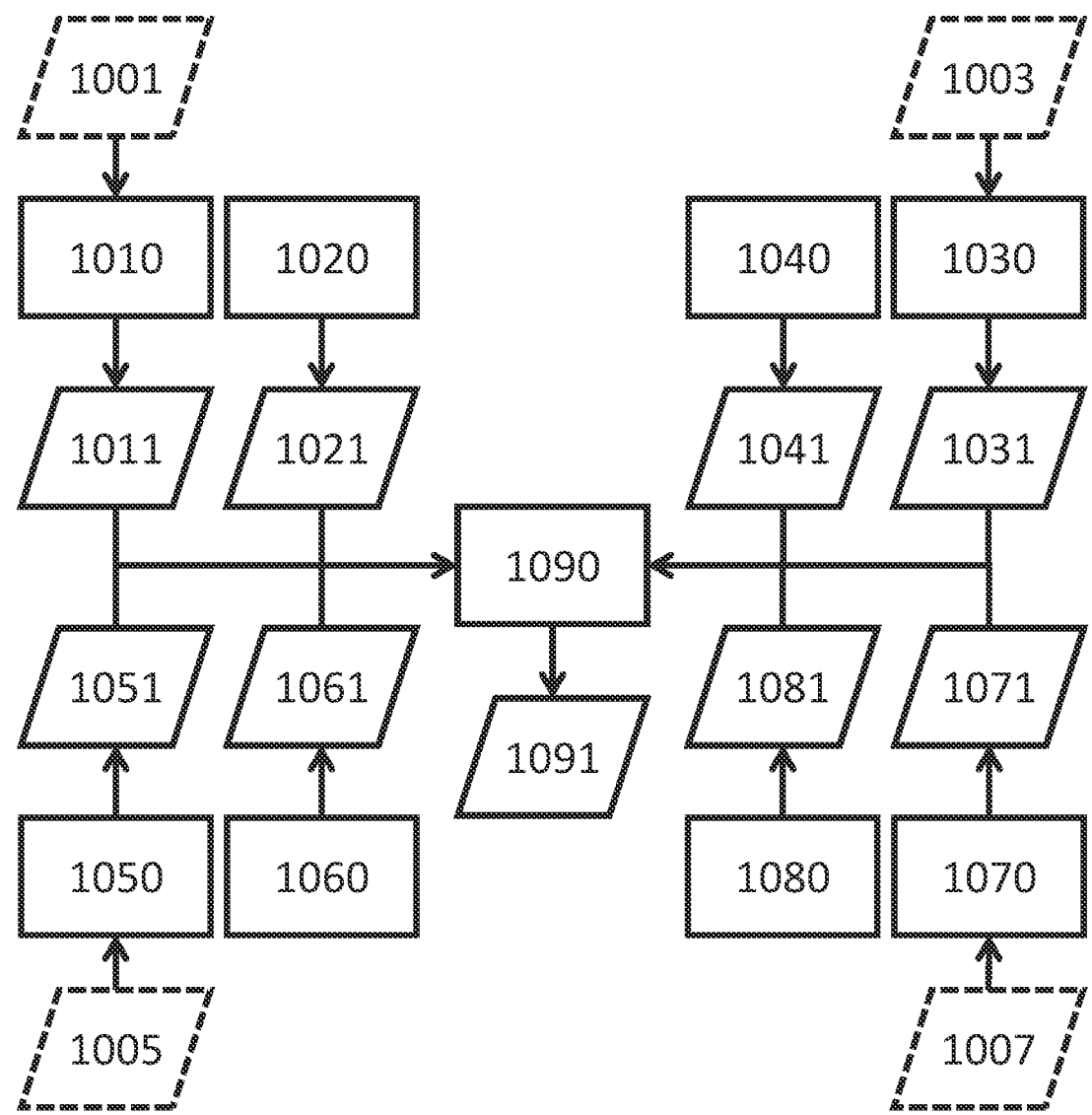
FIG. 10 schematically shows a flowchart of a method, according to an embodiment.

FIG. 10 schematically shows the flowchart of a method, according to an embodiment. In procedure 1010, while a person's head is at a first orientation and the person's eye is gazing at a first point in a 3D space, a first relative orientation 1011 of the eye with respect to a first imaging sensor is obtained. The first relative orientation 1011 of the eye with respect to the first imaging sensor may be obtained based on an image 1001 of a pupil or limbus of the eye obtained by the first imaging sensor. In procedure 1020, while the person's head is at the first orientation and the person's eye is gazing at the first point in the 3D space, a first set 1021 of images by a second imaging sensor of a first pair of points in the 3D space is obtained. In procedure 1030, while the head is at a second orientation rotationally offset from the first orientation and the eye is gazing at the first point, a second relative orientation 1031 of the eye with respect to the first imaging sensor is obtained. The second relative orientation 1031 of the eye with respect to the first imaging sensor may be obtained based on an image 1003 of the pupil or limbus of the eye obtained by the first imaging sensor. In procedure 1040, while the head is at the second orientation rotationally offset from the first orientation and the eye is gazing at the first point, a second set 1041 of images by the second imaging sensor of the first pair of points is obtained. In procedure 1050, while the head is at a third orientation rotationally offset from the second orientation and the eye is gazing at a second point in the 3D space, a third relative orientation 1051 of the eye with respect to the first imaging sensor is obtained. The third relative orientation 1051 of the eye with respect to the first imaging sensor may be obtained based on an image 1005 of the pupil or limbus of the eye obtained by the first imaging sensor. In procedure 1060, while the head is at the third orientation rotationally offset from the second orientation and the eye is gazing at the second point in the 3D space, a first set 1061 of images by the second imaging sensor of a second pair of points in the 3D space is obtained. In procedure 1070, while the head is at a fourth orientation rotationally offset from the third orientation and the eye is gazing at the second point, a fourth relative orientation 1071 of the eye with respect to the first imaging sensor is obtained. The fourth relative orientation 1071 of the eye with respect to the first imaging sensor may be obtained based on an image 1007 of the pupil or limbus of the eye obtained by the first imaging sensor. In procedure 1080, while the head is at the fourth orientation rotationally offset from the third orientation and the eye is gazing at the second point, a second set 1081 of images by the second imaging sensor of the second pair of points is obtained. In procedure 1090, a relative orientation 1091 of the first imaging sensor with respect to the second imaging sensor is determined based on the first relative orientation 1011 of the eye with respect to the first imaging sensor, the second relative orientation 1031 of the eye with respect to the first imaging sensor, the third relative orientation 1051 of the eye with respect to the first imaging sensor, the fourth relative orientation 1071 of the eye with respect to the first imaging sensor, the first set 1021 of images of the first pair of points, the second set 1041 of images of the first pair of points, the first set 1061 of images of the second pair of points, and the second set 1081 of images of the second pair of points.

Figure 11:
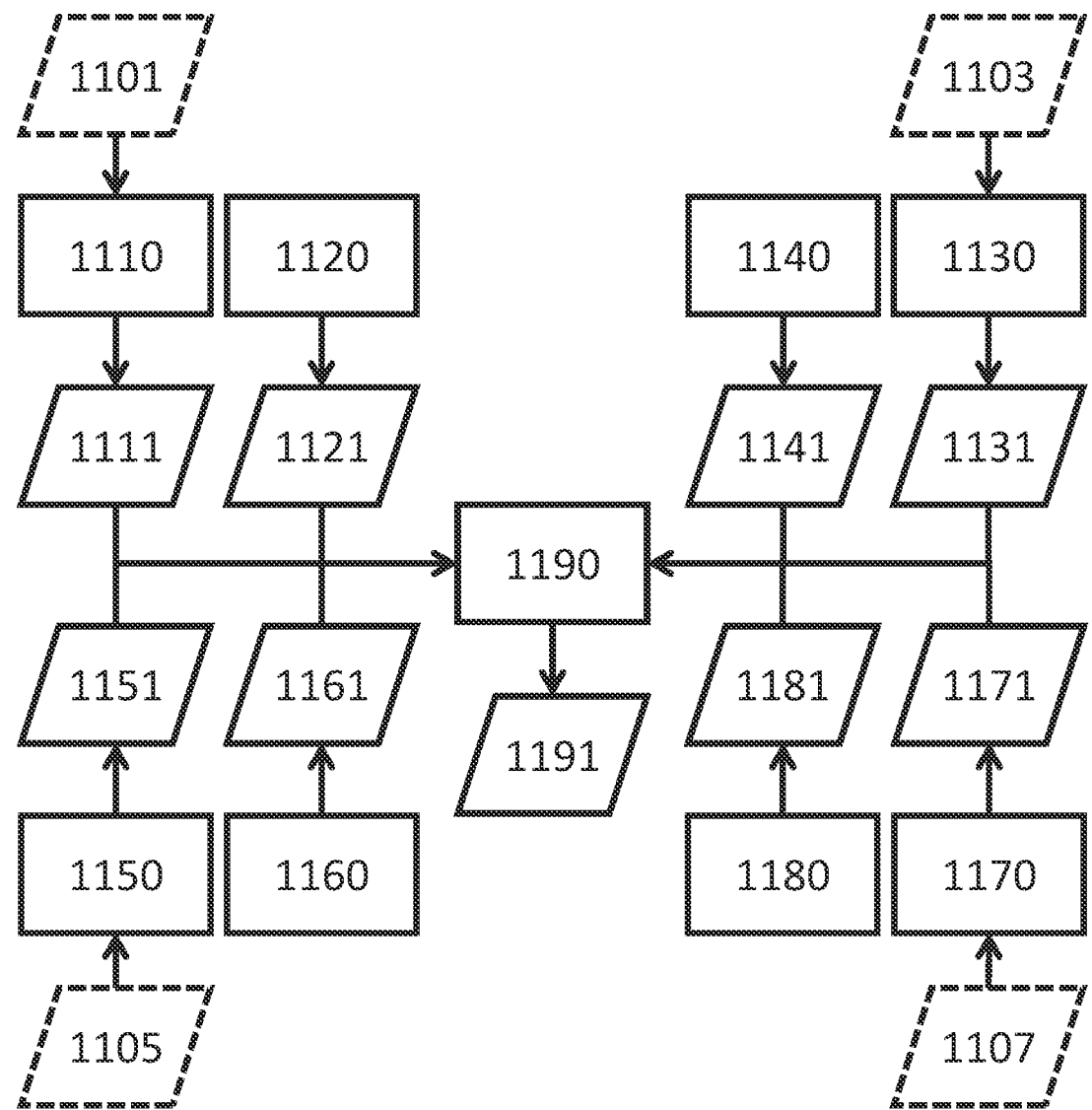
FIG. 11 schematically shows a flowchart of a method, according to an embodiment.

FIG. 11 schematically shows the flowchart of a method, according to an embodiment. In procedure 1110, while a person's head is at a first orientation and the person's eye is gazing at a first point in a 3D space, a first relative orientation 1111 of the eye with respect to an imaging sensor is obtained. The first relative orientation 1111 of the eye with respect to the imaging sensor may be obtained based on an image 1101 of a pupil or limbus of the eye obtained by the imaging sensor. In procedure 1120, while the person's head is at the first orientation and the person's eye is gazing at the first point in the 3D space, a first output 1121 of a spatial orientation sensor is obtained. In procedure 1130, while the head is at a second orientation rotationally offset from the first orientation and the eye is gazing at the first point, a second relative orientation 1131 of the eye with respect to the imaging sensor is obtained. The second relative orientation 1131 of the eye with respect to the imaging sensor may be obtained based on an image 1103 of the pupil or limbus of the eye obtained by the imaging sensor. In procedure 1140, while the person's head is at the second orientation and the person's eye is gazing at the first point in the 3D space, a second output 1141 of the spatial orientation sensor is obtained. In procedure 1150, while the head is at a third orientation rotationally offset from the second orientation and the eye is gazing at a second point in the 3D space, a third relative orientation 1151 of the eye with respect to the imaging sensor is obtained. The third relative orientation 1151 of the eye with respect to the imaging sensor may be obtained based on an image 1105 of the pupil or limbus of the eye obtained by the imaging sensor. In procedure 1160, while the head is at the third orientation rotationally offset from the second orientation and the eye is gazing at the second point in the 3D space, a third output 1161 of the spatial orientation sensor is obtained. In procedure 1170, while the head is at a fourth orientation rotationally offset from the third orientation and the eye is gazing at the second point, a fourth relative orientation 1171 of the eye with respect to the imaging sensor is obtained. The fourth relative orientation 1171 of the eye with respect to the imaging sensor may be obtained based on an image 1107 of the pupil or limbus of the eye obtained by the imaging sensor. In procedure 1180, while the head is at the fourth orientation rotationally offset from the third orientation and the eye is gazing at the second point, a fourth output 1181 of the spatial orientation sensor is obtained. In procedure 1190, a relative orientation 1191 of the imaging sensor with respect to the spatial orientation sensor is determined based on the first relative orientation 1111 of the eye with respect to the imaging sensor, the second relative orientation 1131 of the eye with respect to the imaging sensor, the third relative orientation 1151 of the eye with respect to the imaging sensor, the fourth relative orientation 1171 of the eye with respect to the imaging sensor, the first output 1121 of the spatial orientation sensor, the second output 1141 of the spatial orientation sensor, the third output 1161 of the spatial orientation sensor, and the fourth output 1181 of the spatial orientation sensor.

Methods

C1

Obtaining a confirmed gaze vector v_gaze_ce in eye camera CE coordinate system CS-E from a confirmed gaze point image point p_gaze_cf in field camera CF image plane.

This can be described as:

v_gaze_ce=v_ce_frm_p_cf(q_cf_ce, p_gaze_cf, FOCAL_LEN_f).

Assuming q_cf_ce is the quaternion representing the orientation of field camera CF coordinate system CS-CF to eye camera CE coordinate system CS-CE, in a calibration process, the user looks at an object as a gaze point and the confirmed gaze point image point p_gaze_cf in field camera CF image plane can be obtained. Knowing p_gaze_cf, the confirmed gaze vector v_gaze_cf in camera CF coordinate system can be obtained as:

v_gaze_cf=v_frm_p(p_gaze_cf, FOCAL_LEN_f). See Part A1.4 in the Appendix section.

Therefore:

v_gaze_ce=qvq_trans(q_cf_ce, v_gaze_cf);

FOCAL_LEN_f is the focal length of field camera CF in unit of pixels.

C2

Obtaining a line l_ec_ce passing eye ball center in eye camera CE coordinate system CS-E from confirmed gaze point image point p_gaze_cf in field camera CF image plane and its corresponding pupil center image point (or limbus center image point) p_pupil_ce in eye camera CE image plane:

This can be described as:

l_ec_ce=l_frm_2p(p_gaze_cf, p_pupil_ce, FOCAL_LEN_f, FOCAL_LEN_e)

where:

FOCAL_LEN_f is the focal length of field camera CF in unit of pixels;

FOCAL_LEN_e is the focal length of eye camera CE in unit of pixels.

Under the assumption that q_cf_ce is the quaternion representing the orientation of field camera CF coordinate system CS-CF to eye camera CE coordinate system CS-CE, in a calibration process, the user looks at one object as a gaze point, the confirmed gaze point p_gaze_cf image point in field camera CF image plane can be obtained. In the same time, the corresponding pupil center image point (or limbus center image point) p_pupil_ce in eye camera CE image plane can also be obtained.

Knowing p_pupil_ce and p_gaze_cf, a line passing eye ball center in eye camera CE coordinate system CS-E can be obtained.

First, from the confirmed gaze point image point p_gaze_cf in field camera CF image plane, the confirmed gaze vectors in eye camera CE coordinate system CS-CE can be obtained using (See Part C1 in the Methods section):

v_gaze_ce=v_ce_frm_p_cf(q_cf_ce, p_gaze_cf, FOCAL_LEN_f).

Next, knowing the corresponding pupil center image point (or limbus center image point) p_pupil_ce in eye camera EC image plane, its 3D vector in coordinate system CS-CE can be obtained:

v_pupil_ce=v_frm_p(p_pupil_ce, FOCAL_LEN_e).

Then, a line l_ec_ce that passes the eye ball center in eye camera CE coordinate system CS-CE can be obtained as:

l_ec_ce=(v_d, v_p)

where:

v_d=v_pupil_ce v_p=v_neg(v_gaze_ce)

C3

Obtaining the eye ball center v_ec_ce in eye camera CE coordinate system CS-E from two or more pairs of confirmed gaze point image point p_gaze_cf in field camera CF image plane and its corresponding pupil center image point (or limbus center image point) p_pupil_ce in eye camera CE image plane.

The relative orientation of the field camera CF coordinate system with respect to the eye camera CE coordinate system is assumed known. The user looks at one object as a gaze point, and the confirmed gaze point p_gaze_cf image point in field camera CF image plane can be obtained. In the same time, the corresponding pupil center image (or limbus center image point) point p_pupil_ce in eye camera CE image plane can also be obtained. By doing this two or more times, two or more pairs of (p_gaze_cf_n, p_pupil_ce_n,) are obtained, with n=1, 2, . . .

v_ec_ce=ln_intersect (l_ec_ce_1, . . . , l_ec_ce_n), which is at the intersection of l_ec_ce_1, . . . , l_ec_ce_n.

where:

l_ec_ce_1=l_frm_2p (p_gaze_cf_1, p_pupil_ce_1, FOCAL_LEN_f, FOCAL_LEN_e), which is a line passing the center of the eye ball in CS-CE, obtained from a pair

. . .

l_ec_ce_n=l_frm_2p (p_gaze_cf_n, p_pupil_ce_n, FOCAL_LEN_f, FOCAL_LEN_e), which is a line passing the center of the eye ball in CS-CE, obtained from a pair FOCAL_LEN_f is the focal length of field camera CF in unit of pixels FOCAL_LEN_e is the focal length of eye camera CE in unit of pixels

C4

Obtaining a correction matrix m_corrrect from three pairs of gaze vectors. Each pair of gaze vectors comprises a confirmed gaze vector v_gaze_confirm and its corresponding measured gaze vector v_gaze_measure.

This can be described as:

m_corrrect=m_frm_6v (v_gaze_confirm_1, v_gaze_confirm_2, v_gaze_confirm_3, v_gaze_measure_1, v_gaze_measure_2, v_gaze_measure_3)

where:

m_corrrect=m_prd (m_confirm, mi_measure) (See Part A2.3.1 in the Appendix section) m_confirm=m_frm_v (v_gaze_confirm_1, v_gaze_confirm_2, v_gaze_confirm_3) (See Part A2.3.9 in the Appendix section) mi_measure=m_inv(m_measure) (See Part A2.3.1 in the Appendix section)

m_measure=m_frm_v (v_gaze_measure_1, v_gaze_measure_2, v_gaze_measure_3)

v_gaze_confirm_1 and v_gaze_measure_1 is the first pair of gaze vectors v_gaze_confirm_2 and v_gaze_measure_2 is the second pair of gaze vectors v_gaze_confirm_3 and v_gaze_measure_3 is the third pair of gaze vectors The confirmed gaze vector v_gaze_confirm can be either in field camera CF coordinate system CS-CF or in eye camera CE coordinate system CS-CE, depending on system configurations.

The user looks at one object in front of the field camera as a gaze point. The confirmed gaze point p_gaze_confirm_cf image point in field camera CF image plane can be obtained. In the same time, its corresponding pupil center image point (or limbus center image point) p_pupil_measure_ce in eye camera CE image plane can also be obtained, therefore:

v_gaze_confirm=v_frm_p (p_gaze_confirm_cf, FOCAL_LEN_f)

v_gaze_measure=v_frm_p (p_gaze_measure_ce, FOCAL_LEN_e)

where v_gaze_confirm is the confirmed gaze vector in field camera CF coordinate system v_gaze_measure is the measure gaze vector in eye camera CE coordinate system FOCAL_LEN_f is the focal length of the field camera FOCAL_LEN_e is the focal length of the eye camera By doing this three or more times, three pairs of confirmed gaze vector v_gaze_confirm and their corresponding measured gaze vector v_gaze_measure are obtained.

Under the assumption that the relative orientation of field camera CF coordinate system to eye camera CE coordinate system is known as q_cf_ce, in a calibration process, the user looks at one object in front of the field camera as a gaze point. The confirmed gaze point p_gaze_confirm_cf image point in field camera CF image plane can be obtained. In the same time, its corresponding the pupil center image point (or limbus center image point) p_pupil_measure_ce in eye camera CE image plane can also be obtained, therefore:

v_gaze_confirm=qvq_trans (q_cf_ce, v_gaze_confirm_cf)

v_gaze_measure=v_frm_p (p_gaze_measure_cf, FOCAL_LEN_e)

where v_gaze_confirm_cf=v_frm_p (p_gaze_confirm_cf, FOCAL_LEN_f)

v_gaze_confirm_cf is the confirmed gaze vector in field camera CF coordinate system v_gaze_confirm is the confirmed gaze vector in eye camera CE coordinate system v_gaze_measure is the measure gaze vector in eye camera CE coordinate system FOCAL_LEN_f is the focal length of the field camera FOCAL_LEN_e is the focal length of the eye camera By doing this three or more times, three pairs of confirmed gaze vector v_gaze_confirm and its corresponding measured gaze vector v_gaze_measure are obtained.

C5

Obtaining a corrected gaze vector v_gaze_correct from a measured gaze vector v_gaze_measure and correction matrix m_corrrect obtained using (C4 Method) v_gaze_correct=mv_prd (m_correct, v_gaze_measure). Namely, the corrected gaze vector v_gaze_correct is obtained by multiplying the correction matrix m_corrrect with the measured gaze vector v_gaze_measure.

C6

Obtaining the quaternion q_eye_ce representing orientation of an Eye Coordinate System CS-E relative to eye camera CE coordinate system CS-CE From two gaze Vectors v_gaze_ce_1, v_gaze_ce_2 in CS-CE This can be described as:

$$q\_eye\_ce = q\_eye\_frm\_2v(v\_gaze\_ce\_1, v\_gaze\_ce\_2, \text{method\_index})$$

where:

$$q\_eye\_ce = q\_frm\_2v(v\_r\_1, v\_r\_2, \text{method\_index})$$

$$v\_r\_1 = v\_cru(v\_gaze\_ce\_1, v\_gaze\_ce\_2) \text{(See Part A2.2.8 in the Appendix section)}$$

$$v\_r\_2 = v\_neg(v\_gaze\_ce\_2)$$

method_index indicates one of many different methods that can be used in q_frm_2v (See Part C1 in the Methods section of U.S. Patent Application No. 62/557,786).

In an embodiment with an eye camera CE facing the user's eye, assuming gaze vector in eye camera CE coordinate system CS-CE can be obtained. In a calibration process to determine the orientation of the eye coordinate system CS-E in CS-CE, the user pick an object in the world as a gaze point, the first gaze vector v_gaze_ce_1 in CS-CE is obtained. Without losing the same gaze point, the user rotates the head to a second position, a second gaze vector in CS-CE is v_gaze_ce_2 obtained

C7

Obtaining the quaternion q_eye_ce representing orientation of an eye coordinate system CS-E relative to eye camera CE coordinate system CS-CE from four gaze vectors v_gaze_ce_1, v_gaze_ce_2, v_gaze_ce_3, v_gaze_ce_4 in CS-CE This can be described as:

$$q\_eye\_ce = q\_eye\_frm\_4v(v\_gaze\_ce\_1, v\_gaze\_ce\_2, v\_gaze\_ce\_3, v\_gaze\_ce\_4, \text{method\_index})$$

where:

$$q\_eye\_ce = q\_frm\_2v(v\_r\_1, v\_r\_2, \text{method\_index})$$

$$v\_r\_1 = v\_cru(v\_gaze\_ce\_1, v\_gaze\_ce\_2)$$

$$v\_r\_2 = v\_cru(v\_gaze\_ce\_3, v\_gaze\_ce\_4)$$

method_index indicates one of many different methods that can be used in q_frm_2v (See Part C1 in the Methods section of U.S. Patent Application No. 62/557,786).

In an embodiment with an eye camera CE facing the user's eye, assuming gaze vector in eye camera CE coordinate system CS-CE can be obtained. In a calibration process to determine the orientation of the eye coordinate system CS-E in CS-CE, first, the user pick an object in the world as a gaze point, without losing the same gaze point, the user rotates the head to a first position, a first gaze vector in CS-CE is v_gaze_ce_1 obtained. Without losing the same gaze point, the user rotates the head to a second position, a second gaze vector in CS-CE is v_gaze_ce_2 obtained. Next, the user can pick the same object or a different object in the world as a gaze point. Without losing that gaze point, the user rotates the head to a third position, a third gaze vector in CS-CE is v_gaze_ce_3 obtained. Without losing the same gaze point, the user rotates the head to a fourth position, a fourth gaze vector in CS-CE is v_gaze_ce_4 obtained

C8

Obtaining Orientation q_ref_cf Representing the Orientation of A Reference Coordinate System CS-R Relative to Field Camera CF Coordinate System using images of four fixed physical points PA, PB, PC, PD at three orientations of the camera using a method describe in Part C8 in the Methods section of U.S. Patent Application No. 62/557,786.

$$q\_ref\_cf = q\_frm\_8p(p\_a\_i\_2, p\_b\_i\_2, p\_a\_i\_1, p\_b\_i\_1, p\_c\_i\_2, p\_d\_i\_2, p\_c\_i\_1, p\_b\_i\_d\_1, \text{FOCAL\_LEN}, \text{method\_index})$$

Where:

4 fixed physical points PA, PB, PC, PD are in the field of view of the field camera CF. method_index indicates one of many different methods that can be used in q_frm_8p (See Part C8 in the Methods section of U.S. Patent Application No. 62/557,786).

In the first orientation AB1 of the field camera, the images of point PA and PB in field camera CF coordinate system are obtained as p_a_i_1, p_b_i_1

Next, the camera is rotated to a second orientation AB2, the images of point PA and PB in field camera CF coordinate system are obtained as p_a_i_2, p_b_i_2 Next, without change the orientation of the camera, the images of point PC and PD in field camera CF coordinate system are obtained as p_c_i_1, p_d_i_1 Next, the camera is rotated to a third orientation CD2, the images of point PC and PD in field camera CF coordinate system are obtained as p_c_i_2, p_d_i_2

The first pair of physical points are PA and PB The second pair of physical points are PC and PD The second pair of physical points PC and PD can be the same as or different from PA and PB.

C9

Obtaining Orientation of A Reference Coordinate System CS-R Relative to Field Camera CF Coordinate System using images of four fixed physical points PA, PB, PC, PD at four orientations of the camera using a method describe in Part C8 in the Methods section of U.S. Patent Application No. 62/557,786.

$$q\_ref\_cf = q\_frm\_8p(p\_a\_i\_2, p\_b\_i\_2, p\_a\_i\_1, p\_b\_i\_1, p\_c\_i\_2, p\_d\_i\_2, p\_c\_i\_1, p\_b\_i\_d\_1, \text{FOCAL\_LEN}, \text{method\_index})$$

4 fixed physical points PA, PB, PC, PD are in the field of view of the field camera CF. method_index indicates one of many different methods that can be used in q_frm_8p (See Part C8 in the Methods section of U.S. Patent Application No. 62/557,786).

In the first orientation AB1 of the field camera, the images of point PA and PB in field camera CF coordinate system are obtained as p_a_i_1, p_b_i_1

Next, the camera is rotated to a second orientation AB2, the images of point PA and PB in field camera CF coordinate system are obtained as p_a_i_2, p_b_i_2

Next, the camera is rotated to a third orientation CD1, the images of point PC and PD in field camera CF coordinate system are obtained as p_c_i_1, p_d_i_1

Next, the camera is rotated to a four orientation CD2, the images of point PC and PD in field camera CF coordinate system are obtained as p_c_i_2, p_d_i_2

The first pair of physical points are PA and PB

The second pair of physical points are PC and PD

The second pair of physical points PC and PD can be the same as or different from PA and PB.

C10

Obtaining the orientation quaternion q_r_g representing the orientation of a reference coordinate system CS-R relative to a spatial orientation sensor coordinate system CS-G from three orientation outputs of the spatial orientation sensor using a method q_frm_4q describe in Part C4 in the Methods section of U.S. Patent Application No. 62/557,786.

$$q\_r\_g = q\_frm\_4q(q\_g\_w\_2, q\_g\_w\_1, q\_g\_w\_4, q\_g\_w\_3, \text{method\_index})$$

Where:

q_g_w_1 represents the orientation of the CS-G relative to CS-W in the first orientation q_g_w_2 represents the orientation of the CS-G relative to CS-W in the second orientation q_g_w_3 is the same as q_g_w_2 q_g_w_4 represents the orientation of the CS-G relative to CS-W in the third orientation method_index indicates one of many different methods that can be used in q_frm_4q (See Part C4 in the Methods section of U.S. Patent Application No. 62/557,786).

C11

Obtaining the orientation quaternion q_ref_g representing the orientation of a reference coordinate system CS-R relative to a spatial orientation sensor coordinate system CS-G from four orientation outputs of the spatial orientation sensor using a method q_frm_4q describe in Part C4 in the Methods section of U.S. Patent Application No. 62/557,786.

$$q\_ref\_g = q\_frm\_4q(q\_g\_w\_2, q\_g\_w\_1, q\_g\_w\_4, q\_g\_w\_3, \text{method\_index})$$

Where:

q_g_w_1 represents the orientation of the CS-G relative to CS-W in the first orientation q_g_w_2 represents the orientation of the CS-G relative to CS-W in the second orientation q_g_w_3 represents the orientation of the CS-G relative to CS-W in the third orientation q_g_w_4 represents the orientation of the CS-G relative to CS-W in the fourth orientation method_index indicates one of many different methods that can be used in q_frm_4q (See Part C4 in the Methods section of U.S. Patent Application No. 62/557,786).

C12

Obtaining the orientation quaternion q_ce_cf representing the orientation of an eye camera CE coordinate system CS-CE relative to the field camera CF coordinate system CS-CF from the orientation quaternion q_eye_ce representing the orientation of an eye coordinate system CS-E relative to CS_E, and the orientation quaternion q_ref_cf representing the orientation of a reference coordinate system CS-R relative to CS-CF This can be described as:

$$q\_ce\_cf = q\_prd2(q\_ref\_cf, q\_ce\_eye)(\text{See Part } A2.1.6 \text{ in the Appendix section})$$

where:

$$q\_ce\_eye = q\_cnj(q\_eye\_ce)(\text{See Part } A2.1.3 \text{ in the Appendix section}).$$

It is assumed that eye coordinate system CS-E is aligned closely to reference coordinate system CS-R by following specific steps during a calibration process. The calibration process allows eye camera and field camera to measure two common rotation axes about which the eye and the field camera rotate so that the orientation of eye coordinate system in eye camera coordinate system and a reference coordinate system in field camera coordinate system can be determined.

C13

Obtaining the orientation quaternion q_ce_g representing the orientation of an eye camera CE coordinate system CS-CE relative to the spatial orientation sensor coordinate system CS-G from the orientation quaternion q_eye_ce representing the orientation of an eye coordinate system CS-E relative to CS_E, and the orientation quaternion q_ref_g representing the orientation of a reference coordinate system CS-R relative to CS-G This can be described as:

$$q\_ce\_g = q_{prd2}(q\_ref\_g, q\_ce\_eye)$$

where:

$$q\_ce\_eye = q\_cnj(q\_eye\_ce).$$

It is assumed that eye coordinate system CS-E is aligned closely to reference coordinate system CS-R by following specific steps during a calibration process. The calibration process allows eye camera and spatial orientation sensor to measure two common rotation axes about which the eye and the spatial orientation sensor rotate so that the orientation of eye coordinate system in eye camera coordinate system and a reference coordinate system in the spatial orientation sensor coordinate system can be determined.

APPENDIX

The mathematical tools listed in Appendix are used in the Methods section.

A1. Coordinate Systems

A1.1. A 3D coordinate system has three axes, X, Y and Z, as shown in FIG. 3. Right hand rule is applied for the order of the axes and the positive rotation directions.

Any two axes can form a plane. Therefore, there are three planes defined as P-XY, P-YX and P-ZX planes.

Figure 1:
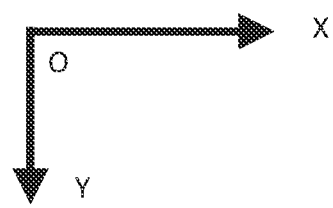
FIG. 1 shows a two-dimensional (2D) coordinate system.
Figure 2:
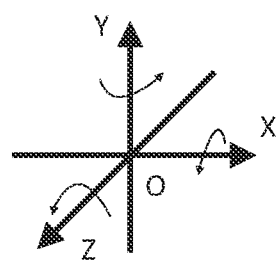
FIG. 2 shows a 3D coordinate system.

A1.2. A 2D coordinate system for camera image frame has two axes, X, Y, as shown in FIG. 1.

A1.3. Converting a point in 2D camera image frame coordinate system to 3D camera coordinate system.

A 3D camera coordinate system has x axis pointing to the right, y axis pointing to the top and z axis pointing to the opposite direction of the lens.

The 2D image plane can be considered:

Being parallel to the XY plan of the CS-C

With its origin at its top-left corner

With its image center sitting at (0, 0, −1) of CS-C

With its X axis being parallel to the X axis of CS-C, pointing to the same direction With its Y axis being parallel to the Y axis of CS-C, pointing to the opposite direction With different unit from CS-C. To be more specific, FOCAL_LEN is the focal length of the camera in unit of pixel counts.

A1.4. A unit vector vu pointing from the origin of the CS-C to the point p in the camera image 2D plane can be calculated:

$$vu = v\_frm\_p(p, \text{FOCAL\_LEN})$$

where:

$$vu = (vx, vy, vz)$$

where $$vu = v\_uni(v)$$

$v=(h,v,-1.0)$ where:

$h=\text{DEFOX}(x)=(x-x\_center)/\text{FOCAL}\_\text{LEN}$ $v=\text{DEFOY}(y)=(y\_center-y)/\text{FOCAL}\_\text{LEN}$ where:
(x_center, y_center) is the coordinates of the center of the camera image 2D frame.

A1.6. A point in 3D Coordinates can be represented by a 3D vector $v=(x, y, z)$. The vector is from the origin of the coordinate system to the position of the point.

A2. Quaternion, 3D Vector, 3×3 Matrix and 2D vector mathematics

A2.1.1. A quaternion has four elements $q=(w,x,y,z)$

A2.1.2. An identity quaternion:

$q=q\_idt(q)=(1,0,0,0)$

A2.1.3. The conjugation of a quaternion:

$q\_cnj(q)=(w,-x,-y,-z)$

A2.1.4. The length of a quaternion:

$q\_len(q)=\text{sqrt}(w*w+x*x+y*y+z*z)$ sqrt( ) is square root of a floating point number.

A2.1.5. A unit quaternion has a length of 1
To unitize a quaternion q:

$u=q\_uni(q)$ where $q=(w,x,y,z)$ $u=(uw,ux,uy,uz)$ $uw=x/len$ $ux=x/len$ $uy=y/len$ $uz=z/len$ $len=q\_len(q)$ A2.1.6. The product of two quaternions q and p $t=q\_prd2(q,p)=q$ where $q=(qw,qx,qy,qz)$ $P=(p_w,p_x,p_y,p_z)$ $t=(tw,tx,ty,tz)$ and $tw=(qw*pw-qx*px-qy*py-qz*pz)$ $tx=(qw*px+qx*pw+qy*pz-qz*py)$ $ty=(qw*py-qx*pz+qy*pw+qz*px)$ $tz=(qw*pz+qx*py-qy*px+qz*pw)$ As a quaternion can be used to represent a rotation transformation, if q2 is product of two quaternion $q2=q\_prd2(q1, q0)$, then applying q2 as an orientation transformation is equivalent to applying q0 and then q1.

A2.1.7 The product of three quaternions $q=q\_prd3(q1,q2,q3)=q\_prd2(g1,q\_prd2(q2,q3))$ A2.1.8 The product of four quaternions $q=q\_prd4(q1,q2,q3,q4)=q\_prd2(q1,q\_prd3(q2,q3,q4))$ A2.1.9 The left difference of two quaternions $q=q\_ldf(q1,q2)=q\_prd2(q\_cnj(q1),q2)$ A2.2.1 A 3D vector has three elements $v=(x,y,z)$ A2.2.2 The length of a 3D vector:

$v\_len(v)=\text{sqrt}(x*x+y*y+z*z)$

A2.2.3 A unit 3D vector has a length of 1
To unitize a 3D vectors v:

$u=v\_uni(v)$ where $v=(x,y,z)$ $u=(ux,uy,uz)$ $ux=x/len$ $uy=y/len$ $uz=z/len$ $len=v\_len(v)$ A2.2.4 A unit quaternion can be interpreted as a combination of rotation vector and an angle rotating about this vector:

$q=(w,x,y,z)$ $v=(vx, vy, vz)$ is the rotation vector
theta is the rotation angle
where $w=\cos(theta/2)$ $x=vx*\sin(theta/2)$ $y=vy*\sin(theta/2)$ $z=vz*\sin(theta/2)$ A2.2.5 Dot product of two 3D vectors va, vb:

$d=v\_dot(va,vb)=va\cdot vb=ax*bx+ay*by+az*bz$ where $va=(ax,ay,az)$ $vb=(bx,by,bz)$ Assuming theta to be angle between va and vb: Then: $\cos(theta)=v\_dot(va, vb)$ A2.2.6 Cross product of two 3D vectors va, vb:

$vc=v\_crs(va,vb)=va\times vb$ where $va=(ax,ay,az)$ $vb=(bx,by,bz)$ $vc=(cx,cy,cz)$ $cx=ay*bz-az*by$ $cy=az*bx-ax*bz$ $cz=ax*by-ay*bx$ A2.2.7. Rotation vector v from unit quaternion q:

$v=v\_frm\_q(q)=(x,y,z)$ where $q=(qw,qx,qy,qz)$ $len=v\_len(qx,qy,qz)$ $x=qx/len$ $y=qy/len$ $z=qz/len.$ A2.2.8. Unitized vector of the cross product of two 3D vectors va, vb:

$v=v\_cru(q)=v\_uni(v\_crs(va,vb)).$

A2.2.9. Rotation degrees from unit quaternion q:

$deg=deg\_frm\_q(q)$ where $q=(qw,qx,qy,qz)$ $deg=2*a\cos(qw)$ acos( ) is arccosine, the output is in unit of degree.

A2.2.10. Adding two 3D vectors va, vb:

$v=v\_add(va,vb)=(x,y,z)$ $va=(ax,ay,az)$ $vb=(bx,by,bz)$ $x=ax+bx$ $y=ay+by$ $z=az+bz.$ A2.2.11. Negative vector of a 3D vectors va:

$v=v\_neg(va)=(x,y,z)$ $va=(ax,ay,az)$ $x=-ax$ $y=-ay$ $z=-az.$

A2.3.1. 3×3 matrix $$m = \begin{pmatrix} Xx & Yx & Zx \\ Xy & Yy & Zy \\ Xz & Yz & Zz \end{pmatrix}$$

A2.3.2. identity 3×3 matrix $$m = m\_idt() == \begin{pmatrix} 1 & 0 & 0 \\ 0 & 1 & 0 \\ 0 & 0 & 1 \end{pmatrix}$$

A2.3.3. matrix subtraction $$m2 = m\_sub(m1, m0) = m1 - m0$$
$$= \begin{pmatrix} Xx1-Xx0 & Yx1-Yx0 & Zx1-Zx0 \\ Xy1-Xy0 & Yy1-Yy0 & Zy1-Zy0 \\ Xz1-Xz0 & Yz1-Yz0 & Zz1-Zz0 \end{pmatrix}$$

$$m1 = \begin{pmatrix} Xx1 & Yx1 & Zx1 \\ Xy1 & Yy1 & Zy1 \\ Xz1 & Yz1 & Zz1 \end{pmatrix}$$

$$m0 = \begin{pmatrix} Xx0 & Yx0 & Zx0 \\ Xy0 & Yy0 & Zy0 \\ Xz0 & Yz0 & Zz0 \end{pmatrix}$$

A2.3.4. matrix vector multiplication $vd = mv\_prd(m, v) = m * vs$ $$m = \begin{pmatrix} Xx & Yx & Zx \\ Xy & Yy & Zy \\ Xz & Yz & Zz \end{pmatrix}$$

$vs = (x, y, z)$ $vd = (dx, dy, dz)$ where:

$dx=Xx*x+Yx*y+Zx*z$ $dy=Xy*x+Yy*y+Zy*z$ $dz=Xz*x+Yz*y+Zz*z$

A2.3.5. matrix from quaternion $m=m\_frm\_q(q)$ $q=(qw,qx,qy,qz)$ where m is a 3×3 matrix $$m = \begin{pmatrix} Xx & Yx & Zx \\ Xy & Yy & Zy \\ Xz & Yz & Zz \end{pmatrix}$$

and $Xx=1.0f-2.0f*qy*qy-2.0f*qz*qz$ $Xy=2.0f*qx*qy+2.0f*qw*qz$ $Xz=2.0f*qx*qz-2.0f*qw*qy$ $Yx=2.0f*qx*qy-2.0f*qw*qz$ $Yy=1.0f-2.0f*qx*qx-2.0f*qz*qz$ $Yz=2.0f*qy*qz+2.0f*qw*qx$ $Zx=2.0f*qx*qz+2.0f*qw*qy$ $Zy = 2.0f*qy*qz - 2.0f*qw*qx$ $Zz = 1.0f - 2.0f*qx*qx - 2.0f*qy*qy$ A2.3.6. Transform a 3D vectors v with a quaternion q:

$vd = qvq\_trans(q,vs) = mv\_prd(m,vs)$ where
q is a quaternion
vs is the source 3D vector
vd is the result 3D vector
m is a 3×3 matrix $m = m\_frm\_q(q)$ A2.3.7. Matrix by rotating x axis $m = m\_frm\_x\_axis\_sc(s,c)$ where $$m = \begin{pmatrix} Xx & Yx & Zx \\ Xy & Yy & Zy \\ Xz & Yz & Zz \end{pmatrix}$$

$s = \sin(theta)$ $c = \cos(theta)$ and $Xx = 1.0$ $Yx = 0.0$ $Zx = 0.0$ $Xy = 0.0$ $Yy = c$ $Zy = -s$ $Xz = 0.0$ $Yz = s$ $Zz = c$ A2.3.8. Matrix by rotating y axis $m = m\_frm\_y\_axis\_sc(s,c)$ where $$m = \begin{pmatrix} Xx & Yx & Zx \\ Xy & Yy & Zy \\ Xz & Yz & Zz \end{pmatrix}$$

$s = \sin(theta)$ $c = \cos(theta)$ and $Xx = c$ $Yx = 0.0$ $Zx = s$ $Xy = 0.0$ $Yy = 1.0$ $Zy = 0.0$ $Xz = -s$ $Yz = 0.0$ $Zz = c$ A2.3.9. Quaternion from matrix $q = q\_frm\_m(m)$ where $q = (w, x, y, z)$ $$m = \begin{pmatrix} Xx & Yx & Zx \\ Xy & Yy & Zy \\ Xz & Yz & Zz \end{pmatrix}$$

and:

```
if (Zz < 0) {
    if (Xx > Yy) {
        t = 1 + Xx - Yy - Zz
        w = Yz - Zy
        x = t
        y = Xy + Yx
        z = Zx + Xz
    } else {
        t = 1 - Xx + Yy - Zz
        w = Zx - Xz
        x = Xy + Yx
        y = t
        z = Yz + Zy
    }
} else {
    if( Xx < -Yy ) {
        t = 1 - Xx - Yy + Zz
        w = Xy - Yx
        x = Zx + Xz
        y = Yz + Zy
        z = t
    } else {
        t = 1 + Xx + Yy + Zz
        w = t
        x = Yz - Zy
        y = Zx - Xz
        z = Xy - Yx
    }
}
```

A2.3.10. Matrix from vector $m = m\_frm\_v(vx,vy,vz)$ where $$m = \begin{pmatrix} Xx & Yx & Zx \\ Xy & Yy & Zy \\ Xz & Yz & Zz \end{pmatrix}$$

$vx = (Xx, Xy, Xz)$ $vy = (Yx, Yy, Yz)$ $vz = (Zx, Zy, Zz)$

A2.4.1. A point in 2D space is also a 2D vector, it has two elements $p = (x,y)$ A2.4.2. The distance d between two 2D points pa, pb is:

$$d = p\_dist(pa, pb) = sqrt((xa - xb)*(xa - xb) + (ya - yb)*(ya - yb))$$

where $$pa=(xa,ya)$$

$$pb=(xb,yb)$$

A2.4.3. The length of a 2D vector:

$$p\_len(p)=sqrt(x*x+y*y)$$

A2.4.4. A unit 2D vector has a length of 1
To unitize a 2D vectors p:

$$u=p\_uni(p)$$

where $$p=(x,y)$$

$$u=(ux,uy)$$

$$ux=x/len$$

$$uy=y/len$$

$$len=p\_len(v)$$

A2.4.5. Dot product of two 2D vectors pa, pb:

$$d=p\_dot(pa,pb)=xa*xb+ya*yb$$

where $$pa=(xa,ya)$$

$$pb=(xb,yb)$$

There is an important property of vector dot product,
Assuming theta to be angle between pa and pb:
Then: cos(theta)=p_dot(pa, pb)

A2.4.6. 2D point from 3D vector:

$$p=p\_frm\_v(v\_in,p\_cent,foc\_len)$$

where p=(xp,yp) is the 2D point
v=(xv,yv,zv) is a 3D vector in camera coordinate system CS-C
p_cent=(xc,yc) is the center point of the image plane
foc_len is the focal length of the camera in unit of pixel
and $$xp=xv*scale+xc;$$

$$yp=-yv*scale+yc;$$

where:scale=foc_len/zv.

A2.5.1 A line in 3D space:
A line l in a 3D space can be represented by a combination of a 3D vector vd for its direction, and a 3D vector vp for a point that it passes.
Therefore:

$$l=(vd,vp)$$

where:

$$vd=(xd,yd,zd)$$

$$vp=(xp,yp,zp)$$

A2.5.2 A point on a line in 3D space:

$$v=v\_on\_l(l,k)$$

where:

$$l=(vd,vp)$$

k is a floating-point number $$v=v\_add(vp,v\_scale(vd,k))$$

A2.5.3 Distance d of a point v on a line l in 3D space:

$$d=vl\_dist(v,l)$$

where:

$$len=v\_dist(v,vl)$$

$$vl=v\_on\_l(l,k)$$

k is a value that generates minimum value of len.

A2.5.4 Intersection of two lines in 3D space
Two lines la and lb in a 3D space do not always intersect. The intersection point can be defined as a point that has the minimum sum of distance to both lines.

$$vi=l2\_intersect(l0,l1)$$

where $$l0=(vd0,vp0)$$

$$l1=(vd1,vp1)$$

and $$d0=vl\_dist(vi,l0)$$

$$d1=vl\_dist(vi,l1)$$

dsum=d0+d01 vi is the point is 3D space that results in the minimum value of dsum.

A2.5.3 Intersection of multiple lines in 3D space
Multiple lines l0, l0 . . . ln in 3D space do not always intersect. One definition of the intersection point can be defined as a point that has the minimum sum of square of distance to all lines.

$$vi=ln\_intersect(l0,l1,\ldots,ln)$$

where $$l0 = (vd0, vp0)$$

$$l1 = (vd1, vp1)$$

...

$$ln = (vdn, vpn)$$

and $$d0 = vl\_dist(vi, l0)$$

$$d1 = vl\_dist(vi, l1)$$

...

$$dn = vl\_dist(vi, ln)$$

$$dsum = (d0*d0) + (d1*d1) + \ldots + (dn*dn)$$

vi is the point is 3D space that results in the minimum value of drum.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
    while a person's head is at a first orientation and the person's eye is gazing at a first point in a 3D space, obtaining a first relative orientation of the eye with respect to an imaging sensor, and obtaining a first spatial orientation of a spatial orientation sensor;
    while the head is at a second orientation rotationally offset from the first orientation and the eye is gazing at the first point, obtaining a second relative orientation of the eye with respect to the imaging sensor, and obtaining a second spatial orientation of the spatial orientation sensor;
    while the head is at a third orientation and the eye is gazing at a second point in the 3D space, obtaining a third relative orientation of the eye with respect to the imaging sensor, and obtaining a third spatial orientation of the spatial orientation sensor;
    while the head is at a fourth orientation rotationally offset from the third orientation and the eye is gazing at the second point, obtaining a fourth relative orientation of the eye with respect to the imaging sensor, and obtaining a fourth spatial orientation of the spatial orientation sensor;
    determining a relative orientation of the imaging sensor with respect to the spatial orientation sensor based on the first relative orientation of the eye with respect to the imaging sensor, the second relative orientation of the eye with respect to the imaging sensor, the third relative orientation of the eye with respect to the imaging sensor, the fourth relative orientation of the eye with respect to the imaging sensor, the first spatial orientation of the spatial orientation sensor, the second spatial orientation of the spatial orientation sensor, the third spatial orientation of the spatial orientation sensor, and the fourth spatial orientation of the spatial orientation sensor.

2. The method of claim 1, wherein obtaining the first relative orientation, the second relative orientation, the third relative orientation or the fourth relative orientation of the eye with respect to the imaging sensor is based on an image of a pupil or limbus of the eye obtained by the imaging sensor.

3. The method of claim 1, wherein the third orientation is rotationally offset from the second orientation.

4. The method of claim 1, wherein the third orientation and the second orientation are the same.

5. The method of claim 1, wherein the first point is the same as the second point.

6. A computer program product comprising a non-transitory computer readable medium having instructions recorded thereon, the instructions when executed by a computer implementing the method of claim 1.

* * * * *